United States Patent
Neshaastegaran et al.

(10) Patent No.: US 11,722,202 B1
(45) Date of Patent: Aug. 8, 2023

(54) COMMUNICATION SYSTEMS, METHODS, AND NON-TRANSITORY COMPUTER-READABLE STORAGE DEVICES USING ORBITAL ANGULAR MOMENTUM BEAMS

(71) Applicant: HUAWEI TECHNOLOGIES CO., LTD., Guangdong (CN)

(72) Inventors: Peyman Neshaastegaran, Stittsville (CA); Ming Jian, Kanata (CA)

(73) Assignee: HUAWEI TECHNOLOGIES CO., LTD., Gunagdong (CN)

( * ) Notice: Subject to any disclaimer, the term of this patent is extended or adjusted under 35 U.S.C. 154(b) by 0 days.

(21) Appl. No.: 17/744,859

(22) Filed: May 16, 2022

Related U.S. Application Data

(60) Provisional application No. 63/313,591, filed on Feb. 24, 2022.

(51) Int. Cl.
*H04B 7/08* (2006.01)
*H04B 7/01* (2006.01)
*H04B 7/06* (2006.01)

(52) U.S. Cl.
CPC .............. *H04B 7/084* (2013.01); *H04B 7/01* (2013.01); *H04B 7/0617* (2013.01)

(58) Field of Classification Search
CPC ......... H04B 7/084; H04B 7/01; H04B 7/0617
USPC ........................................................ 375/267
See application file for complete search history.

(56) References Cited

U.S. PATENT DOCUMENTS

2019/0334609 A1* 10/2019 Alavi ................. H01Q 3/34
2020/0228195 A1   7/2020 Sasaki et al.
2022/0407579 A1* 12/2022 Landis ................ H04B 17/309

FOREIGN PATENT DOCUMENTS

| CN | 110266354 A | 9/2019 |
|---|---|---|
| CN | 111133697 A | 5/2020 |
| CN | 110266354 B | 5/2021 |
| EP | 3691150 A1 | 8/2020 |
| JP | 6663328 B2 | 3/2018 |
| JP | 2019062297 A | 4/2019 |
| JP | WO2019059406 A1 | 11/2020 |
| JP | 6811155 B2 | 1/2021 |
| KR | 20160091762 A | 8/2016 |

(Continued)

OTHER PUBLICATIONS

Y. Zhou, H. Tian and G. Nie, "Novel method of axis alignment in orbital angular momentum wireless communication," in IEEE Wireless Communications and Networking Conference (WCNC), 2015.

(Continued)

*Primary Examiner* — Fitwi Y Hailegiorgis
(74) *Attorney, Agent, or Firm* — Locke Lord LLP; Tim Tingkang Xia, Esq.

(57) ABSTRACT

A method for mitigating inter-mode interference (IMI) caused by antenna misalignment in an orbital angular momentum (OAM) mode multiplexing (OAM-MM) system and detecting a signal in an OAM beam. The method includes receiving an OAM beam bearing a signal, determining a phase-shifting value based on at least one of a type of the antenna misalignment and one or more antenna-misalignment parameters, wherein the phase-shifting value belongs to a beamforming (BF) codebook, shifting the phase of the received OAM beam using the determined phase-shifting value, and detecting the signal from the phase-shifted OAM beam.

20 Claims, 11 Drawing Sheets

(56) References Cited

FOREIGN PATENT DOCUMENTS

WO     WO2019059406 A1     3/2019
WO     WO2021107348 A1     6/2021

OTHER PUBLICATIONS

X. Wu, J. Liu, and S. Yu, "Inter-mode crosstalk compensation for radio orbital angular momentum multiplexing systems under misaligned condition using multiple-input multiple-output techniques," in International Conference on Optical Communications and Networks, 2016.

R. Chen, H. Xu, J. Li, and Y. Zhang, "Misalignment-robust receiving scheme for UCA-based OAM communication systems," in IEEE Vehicular Technology, 2017.

R. Chen, H. Xu, M. Moretti and J. Li, "Beam Steering for the Misalignment in UCA-Based OAM Communication Systems," IEEE Wireless Communications Letters, 2018.

D. Wubben, R. Bohnke, V. Kuhn, and K.-D. Kammeyer, "MMSE extension of V-BLAST based on sorted QR decomposition," in IEEE Vehic. Technol. Conf, 2003.

S. Payami, M. Ghoraishi, and M. Dianati, "Hybrid beamforming for large antenna arrays with phase shifter selection," IEEE Transactions on Wireless Communication, vol. 15, No. 11, pp. 7258-7271, 2016.

* cited by examiner

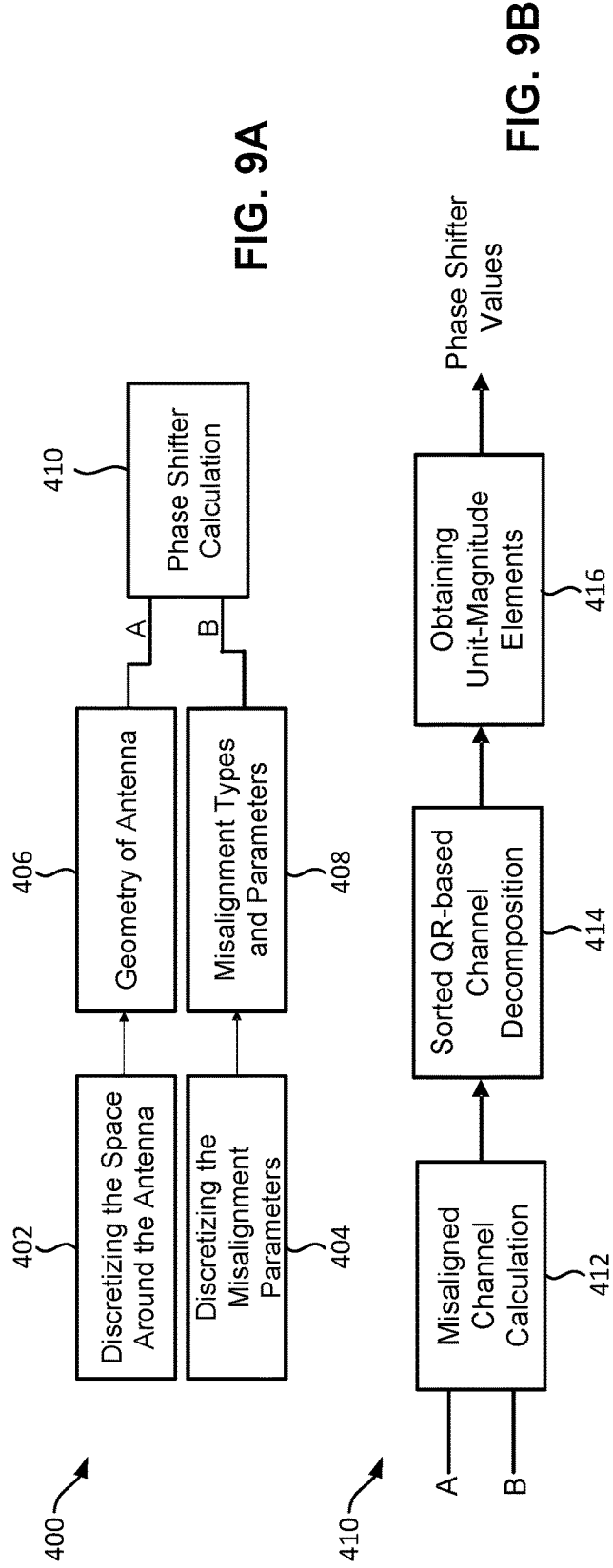
FIG. 9A
FIG. 9B
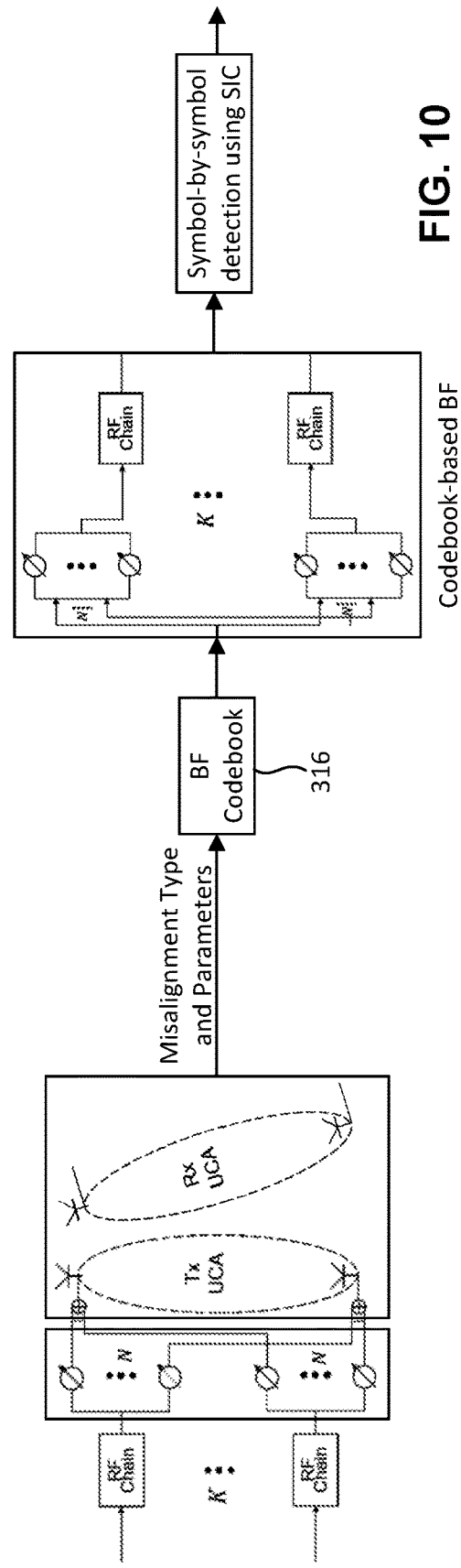
FIG. 10

COMMUNICATION SYSTEMS, METHODS, AND NON-TRANSITORY COMPUTER-READABLE STORAGE DEVICES USING ORBITAL ANGULAR MOMENTUM BEAMS

CROSS-REFERENCE TO RELATED APPLICATIONS

This application claims the benefit of U.S. Provisional Patent Application Ser. No. 63/313,591, filed Feb. 24, 2022, the content of which is incorporated herein by reference in its entirety.

FIELD OF THE DISCLOSURE

The present disclosure relates generally to communication systems and methods, and in particular to communication systems and methods using orbital angular momentum beams with compensation of antenna misalignment.

BACKGROUND

For ease of reading, subsection D of the Detailed Description lists the acronyms used in this disclosure. Subsection E of the Detailed Description lists the acronyms used in this disclosure, the content of each of which is incorporated herein by reference in its entirety.

Over the past two decades, using the orbital angular momentum (OAM) property of electromagnetic (EM) waves to increase the spectral efficiency of optical and wireless communication systems has attracted a lot of attention among researchers. The key aspect in designing an OAM transmission system is to develop methodologies to generate OAM beams at the transmitter side and to detect the OAM beams at the receiver side. In wireless communication systems, the OAM beams are commonly generated by an antenna array (AA) such as uniform circular array (UCA).

SUMMARY

According to one aspect of this disclosure, there is provided a method for detecting a signal from a received orbital angular momentum (OAM) beam transmitted from a transmitting antenna array to a receiving antenna array, the receiving antenna array comprising a plurality of receiving antennas each receiving a copy of the OAM beam, the method comprising: determining a set of phase-shifting values based on a parameter-value set of a set of antenna-misalignment parameters between the transmitting and receiving antenna arrays, the set of antenna-misalignment parameters comprising one or more antenna-misalignment parameters and the parameter-value set comprising one or more values of the one or more antenna-misalignment parameters; shifting phases of the received copies of the OAM beams using the set of determined phase-shifting values to obtain a plurality of phase-shifted copies of the OAM beams; and detecting the signal by combining the plurality of phase-shifted copies of the OAM beams.

In some embodiments, said shifting the phases of the received copies of the OAM beams using the set of determined phase-shifting values comprises: shifting the phases of the received copies of the OAM beams using the set of determined phase-shifting values in an analog domain.

In some embodiments, said shifting the phases of the received copies of the OAM beams using the set of determined phase-shifting values comprises: shifting the phases of the received copies of the OAM beams using the set of determined phase-shifting values in a radio-frequency (RF) band.

In some embodiments, said detecting the signal by combining the plurality of phase-shifted copies of the OAM beams comprises: converting the plurality of phase-shifted copies of the OAM beams to a baseband; and extracting the signal from the converted copies of the OAM beams using a successive interference cancellation (SIC) method.

In some embodiments, the set of antenna-misalignment parameters comprises: a non-parallel angle $\phi$ between the transmitting antenna array and the receiving antenna array, or a combination of an off-axis distance $r$ and an off-axis angle $\theta$ between the transmitting antenna array and the receiving antenna array.

In some embodiments, said determining the set of phase-shifting values comprises: determining a misaligned channel $\overline{H}$ based on the parameter-value set; determining an augmented channel matrix $\hat{H}$ being an aggregation of a combined channel matrix $H$ and a covariance matrix of an additive noise, the combined channel matrix $H$ combining the misaligned channel $\overline{H}$ and a transmitting BF matrix; calculating a set of unit-magnitude values based on the augmented channel matrix $\hat{H}$; and determining the set of phase-shifting values as phases of the set of unit-magnitude values.

In some embodiments, said determining the set of phase-shifting values as phases of the set of unit-magnitude values comprises: quantizing the phases of the set of unit-magnitude values to a predefined number of bits; and determining the set of phase-shifting values as the quantized phases.

In some embodiments, said determining the set of unit-magnitude elements based on the augmented channel matrix $\hat{H}$ comprises: decomposing the augmented channel matrix $\hat{H}$ using a sorted QR (SQR) decomposition method to obtain an orthogonal matrix $\hat{Q}=[Q_1^T, Q_2^T]^T$ with $Q_1$ being the upper portion of $\hat{Q}$ having a same number of rows as the combined channel matrix $H$; partitioning the orthogonal matrix $\hat{Q}$ to the summation of two matrices $\hat{Q}_A$ and $\hat{Q}_B$ having unit-magnitude elements; retrieving a portion $Q_{A1}$ of $\hat{Q}_A$ having a same size as $Q_1$; retrieving a portion $Q_{B1}$ of $\hat{Q}_B$ having a same size as $Q_1$; and using elements of $Q_{A1}$ and $Q_{B1}$ as the set of unit-magnitude values.

In some embodiments, said determining the set of phase-shifting values comprises: selecting the set of phase-shifting values from a beamforming (BF) codebook based on the parameter-value set.

In some embodiments, the BF codebook is constructed by: determining one or more ranges for the one or more antenna-misalignment parameters; obtaining a plurality of possible parameter-value sets within the one or more ranges; for each possible parameter-value set of the plurality of parameter-value sets, determining a misaligned channel $\overline{H}$ based on the possible parameter-value set, determining an augmented channel matrix $\hat{H}$ being an aggregation of a combined channel matrix $H$ and a covariance matrix of an additive noise, the combined channel matrix $H$ combining the misaligned channel $\overline{H}$ and a transmitting BF matrix, determining a set of unit-magnitude values based on the augmented channel matrix $\hat{H}$, determining a set of possible phase-shifting values as phases of the set of unit-magnitude values, and adding the set of possible phase-shifting values to the BF codebook.

In some embodiments, said determining the set of possible phase-shifting values further comprises: quantizing the phases of the set of unit-magnitude values to a predefined number of bits; and determining the set of possible phase-shifting values as the quantized phases.

In some embodiments, said determining the set of unit-magnitude elements based on the augmented channel matrix $\hat{H}$ comprises: decomposing the augmented channel matrix $\hat{H}$ using a sorted QR (SQR) decomposition method to obtain an orthogonal matrix $\hat{Q}=[Q_1^T, Q_2^T]^T$ with $Q_1$ being the upper portion of $\hat{Q}$ having a same number of rows as the combined channel matrix H; partitioning the orthogonal matrix $\hat{Q}$ to the summation of two matrices $\hat{Q}_A$ and $\hat{Q}_B$ having unit-magnitude elements; retrieving a portion $Q_{A1}$ of $\hat{Q}_A$ having a same size as $Q_1$; retrieving a portion $Q_{B1}$ of $\hat{Q}_B$ having a same size as $Q_1$; and using elements of $Q_{A1}$ and $Q_{B1}$ as the set of unit-magnitude values.

According to one aspect of this disclosure, there is provided an apparatus for detecting a signal from a received orbital angular momentum (OAM) beam transmitted from a transmitting antenna array to a receiving antenna array, the receiving antenna array comprising a plurality of receiving antennas each receiving a copy of the OAM beam, the apparatus comprising: at least one processor for: determining a set of phase-shifting values based on a parameter-value set of a set of antenna-misalignment parameters between the transmitting and receiving antenna arrays, the set of antenna-misalignment parameters comprising one or more antenna-misalignment parameters and the parameter-value set comprising one or more values of the one or more antenna-misalignment parameters; shifting phases of the received copies of the OAM beams using the set of determined phase-shifting values to obtain a plurality of phase-shifted copies of the OAM beams; and detecting the signal by combining the plurality of phase-shifted copies of the OAM beams.

According to one aspect of this disclosure, there is provided one or more non-transitory computer-readable storage devices comprising computer-executable instructions for constructing a BF codebook, wherein the instructions, when executed, cause a processing structure to perform actions comprising: determining one or more ranges for the one or more antenna-misalignment parameters; obtaining a plurality of possible parameter-value sets within the one or more ranges; for each possible parameter-value set of the plurality of parameter-value sets, determining a misaligned channel $\bar{H}$ based on the possible parameter-value set, determining an augmented channel matrix $\hat{H}$ being an aggregation of a combined channel matrix H and a covariance matrix of an additive noise, the combined channel matrix H combining the misaligned channel $\bar{H}$ and a transmitting BF matrix, determining a set of unit-magnitude values based on the augmented channel matrix $\hat{H}$, determining a set of possible phase-shifting values as phases of the set of unit-magnitude values, and adding the set of possible phase-shifting values to the BF codebook.

The methods and apparatuses described herein provide a codebook-based receiver-side solution for mitigating inter-mode interference (IMI) caused by antenna misalignment in an orbital angular momentum (OAM) mode multiplexing (OAM-MM) system with near-optimal performance and high robustness against implementation errors.

BRIEF DESCRIPTION OF THE DRAWINGS

FIGS. 5A to 5C show some examples of antenna misalignment between a transmitter and a receiver in a uniform circular array (UCA) based orbital angular momentum (OAM) mode multiplexing (OAM-MM) system shown in FIG. 1, wherein FIG. 5A shows the non-parallel antenna-misalignment, FIG. 5B shows the off-axis antenna-misalignment, and FIG. 5C shows the transmitter and receiver with both non-parallel and off-axis antenna-misalignments;

FIG. 9A is a block diagram showing a process for generating a BF codebook for use in the OAM-MM system shown in FIG. 1 for misalignment mitigation;

FIG. 9B shows the detail of the phase shifter calculation step of the process shown in FIG. 9A;

FIG. 10 is a block diagram showing the OAM-MM system shown in FIG. 1 with antenna misalignment, which uses the BF codebook generated using the process shown in FIG. 9A for misalignment mitigation;

DETAILED DESCRIPTION

A. System Structure

Figure 1:
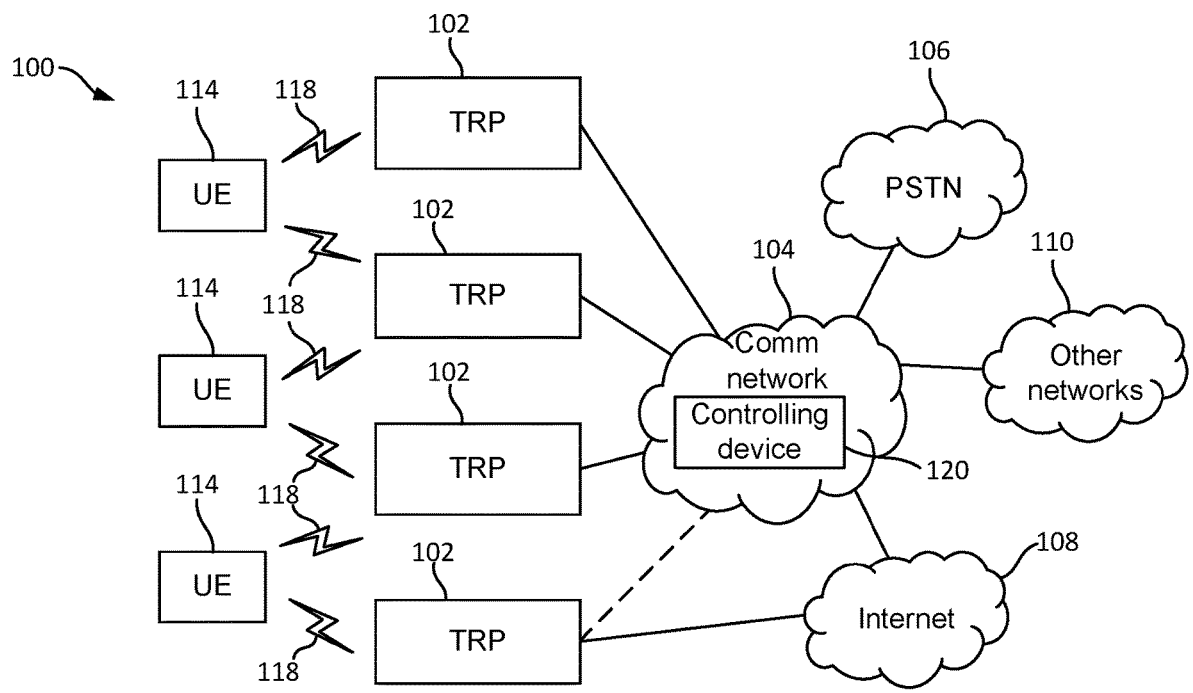
FIG. 1 is a simplified schematic diagram showing the structure of a communication system, according to some embodiments of this disclosure.

Turning now to FIG. 1, a communication system is shown and is generally identified using reference numeral 100. As shown, the communication system 100 comprises a plurality of transmit-receive points (TRPs) 102 (also denoted "communication nodes" hereinafter) in communication with a communication network 104 and in turn with one or more public switched telephone networks (PSTNs) 106, the Internet 108, and other networks 110 via the communication network 104. Some TRPs 102 may access the communication network 104 via the Internet 108. Some TRPs 102 may also directly communicate with each other.

A plurality of user equipments (UEs) 114 are in wireless communication with the TRPs 102 for accessing the communication network 104, the PSTNs 106, the Internet 108, and other networks 110 for making and/or receiving phone calls (for example, to other UEs 114, landline phones (not shown), and/or the like), sending and/or receiving data (such as emails, instant messages, and/or the like), accessing contents (such as text content, audio content, video content, and/or the like), and/or the like. Examples of UEs 114 may be smartphones, personal digital assistants (PDAs), laptops, computers, tablets, vehicles, sensors, and/or the like.

As those skilled in the art will appreciate, the communication system 100 may operate by sharing resources such as frequency-domain resources, time-domain resources, spatial-domain resources, code-domain resources, and/or the like, and allow data transmission (such as voice, data, video, text, and/or the like) via broadcast (one device to all devices in the system 100; that is, one-to-all), multicast (one device to a plurality of device; that is, one-to-many), unicast (one device to another device such as one UE to another UE; that is, one-to-one), and/or the like.

The PSTN 106 may include circuit-switched telephone networks for providing plain old telephone service (POTS). The Internet 108 may include a network of computers and subnets (intranets) or both, and incorporate protocols such as IP, TCP, UDP, and/or the like.

The communication network 104 comprises one or more controlling devices 120 in communication with the TRPs 102 to provide various services such as voice, data, and other services to the UEs 114. The one or more controlling devices 120 of the communication network 114 may also serve as a gateway access between (i) the TRPs 102 or UEs 114 or both, and (ii) other networks (such as the PSTN 106, the Internet 108, and the other networks 110).

Figure 2:
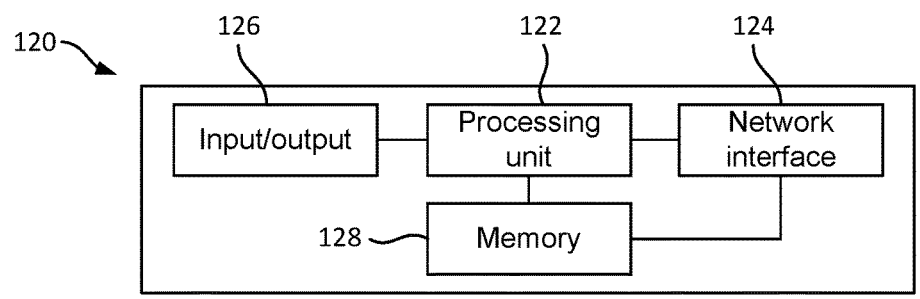
FIG. 2 is a simplified schematic diagram of a controlling device of a communication network of the communication system shown in FIG. 1.

FIG. 2 is a simplified schematic diagram of the controlling device 120. As shown, the controlling device 120 comprises at least one processing unit 122 (also denoted "processor"), at least one network interface 124, one or more input/output components or interfaces 126, and at least one memory 128 (also denoted "storage device" hereinafter).

The processing unit 122 is configured for performing various processing operations and may comprise a microprocessor, a microcontroller, a digital signal processor, a field programmable gate array (FPGA), an application specific integrated circuit (ASIC), and/or the like.

The network interface 124 comprises a circuitry for directly or indirectly (that, via one or more intermediate devices) communicating with other devices such as the TRPs 102, the PSTN 106, the Internet 108, and other networks 110 using suitable wired or wireless communication technologies and suitable protocols.

Each input/output component 126 enables interaction with a user or other devices in the communication system 100. Each input/output device 126 may comprise any suitable structure for providing information to or receiving information from a user and may be, for example, a speaker, a microphone, a keypad, a keyboard, a computer mouse, a display, a touch screen, and/or the like.

Each memory 128 may comprise any suitable volatile and/or non-volatile storage and retrieval components such as random access memory (RAM), read only memory (ROM), hard disk, optical disc, subscriber identity module (SIM) card, solid-state memory modules, memory stick, secure digital (SD) memory card, and/or the like. The memory 128 may be used for storing instructions executable by the processing unit 122 and data used, generated, or collected by the processing unit 122 and/or the network interface 124. For example, the memory 126 may store software instructions or modules executable by the processing unit 122 for implementing some or all of the functionalities and/or embodiments of the controlling device 120 described herein. The memory 126 may also store coverage information of the TRPs 102 in, for example, a database thereof.

Referring back to FIG. 1, the TRPs 102 may typically comprise a base station and optionally other components such as one or more base-station controllers (BSCs), radio-network controllers (RNCs), relay nodes, elements, and/or the like. Each TRP 102 (or more specifically the base station thereof) transmits and/or receives wireless signals within a particular geographic region or area (that is, a "cell" or a "coverage area"). A cell may be further partitioned into cell sectors, and a TRP 102 may, for example, employ multiple transceivers to provide service to multiple cell sectors. In some embodiments, there may be established pico or femto cells where the radio-access technology supports such. In some embodiments, multiple transceivers may be used for each cell, for example using multiple-input multiple-output (MIMO) technologies.

Figure 3:
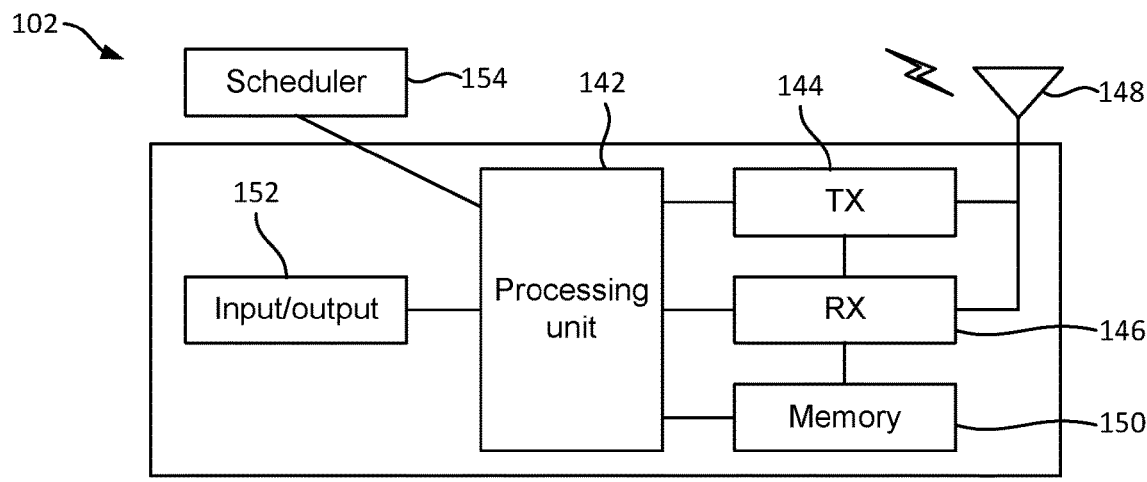
FIG. 3 is a simplified schematic diagram of a transmit-receive point (TRP) of the communication system shown in FIG. 1.

FIG. 3 is a simplified schematic diagram of a TRP 102. As shown, the TRP 102 in these embodiments comprises at least one processing unit or processor 142, at least one transmitter 144, at least one receiver 146, one or more antennas 148, at least one memory 150, and one or more input/output components or interfaces 152. A scheduler 154 may be coupled to the processing unit 142. The scheduler 154 may be included within or operated separately from the TRP 102. Those skilled in the art will appreciate that, in other embodiments and as needed, the TRP 102 may comprise more or less components than the components shown in FIG. 3.

The processing unit 142 is configured for performing various processing operations such as signal coding, data processing, power control, input/output processing, or any other suitable functionalities. The processing unit 142 may comprise a microprocessor, a microcontroller, a digital signal processor, a FPGA, an ASIC, and/or the like.

Each transmitter 144 may comprise any suitable structure for generating signals for wireless transmission to one or more UEs 114 or other devices. Each receiver 146 may comprise any suitable structure for processing signals received wirelessly from one or more UEs 114 or other devices. Although shown as separate components, at least one transmitter 144 and at least one receiver 146 may be integrated and implemented as a transceiver. Each antenna 148 may comprise any suitable structure for transmitting and/or receiving wireless signals. Although a common antenna 148 is shown in FIG. 3 as being coupled to both the transmitter 144 and the receiver 146, one or more antennas 148 may be coupled to the transmitter 144, and one or more separate antennas 148 may be coupled to the receiver 146.

Each memory 150 may comprise any suitable volatile and/or non-volatile storage and retrieval components such as RAM, ROM, hard disk, optical disc, SIM card, solid-state memory modules, memory stick, SD memory card, and/or the like. The memory 150 may be used for storing instructions executable by the processing unit 142 and data used, generated, or collected by the processing unit 142. For example, the memory 150 may store software instructions or modules executable by the processing unit 142 for implementing some or all of the functionalities and/or embodiments of the TRP 102 described herein.

Each input/output component 152 enables interaction with a user or other devices in the system 100. Each input/output device 152 may comprise any suitable structure for providing information to or receiving information from a user and may be, for example, a speaker, a microphone, a keypad, a keyboard, a computer mouse, a display, a touch screen, a network communication interface, and/or the like.

Referring back to FIG. 1, the TRPs 102 may communicate with the UEs 114 over one or more air interfaces 118 using any suitable wireless communication links such as radio frequency (RF), microwave, infrared (IR), and/or the like. The air interfaces 118 may utilize any suitable channel access methods such as time division multiple access (TDMA), frequency division multiple access (FDMA), orthogonal FDMA (OFDMA), single-carrier FDMA (SC-FDMA), code division multiple access (CDMA), wideband CDMA (WCDMA), and/or the like.

The air interfaces 118 may use any suitable radio access technologies such as universal mobile telecommunication system (UMTS), high speed packet access (HSPA), HSPA+ (optionally including high speed downlink packet access (HSDPA), high-speed uplink packet access (HSUPA), or both), Long-Term Evolution (LTE), LTE-A, LTE-B, IEEE 802.11, 802.15, 802.16, CDMA2000, CDMA2000 1×, CDMA2000 EV-DO, IS-2000, IS-95, IS-856, global system for mobile communications (GSM), enhanced data rates for GSM evolution (EDGE), GSM EDGE radio access network (GERAN), 5G New Radio (5G NR), standard or non-standard satellite internet access technologies, future communications technologies, and/or the like. Moreover, the communication system 100 may use multiple channel access functionality. Of course, other multiple access methods and wireless protocols may be used.

Herein, a UE 114 generally refers to a wireless device that may join the communication system 100 via an initial access procedure. In various embodiments, a UE 114 may be a wireless device used by a human or user (such as a smartphone, a cellphone, a personal digital assistant (PDA), a laptop, a computer, a tablet, a smart watch, a consumer electronics device, and/or the like. A UE 114 may alternatively be a wireless sensor, an Internet-of-things (IoT) device, a robot, a shopping cart, a vehicle, a smart TV, a smart appliance, or the like. Depending on the implementation, the UE 114 may be movable autonomously or under the direct or remote control of a human, or may be positioned at a fixed position. In some embodiments, a UE 114 may be a network device (such as a TRP 102, a wireless transmit/receive unit (WTRU), a mobile station, a fixed or mobile subscriber unit, a machine type communication (MTC) device, a device of the communication network 104, or the like) which is considered as a UE when it is powered on and joins the communication system 100 via an initial access procedure; and then acts as a network device after the initial access procedure is completed. In some embodiments, the UEs 114 may be multimode devices capable of operation according to multiple radio-access technologies and incorporate multiple transceivers necessary to support such.

Figure 4:
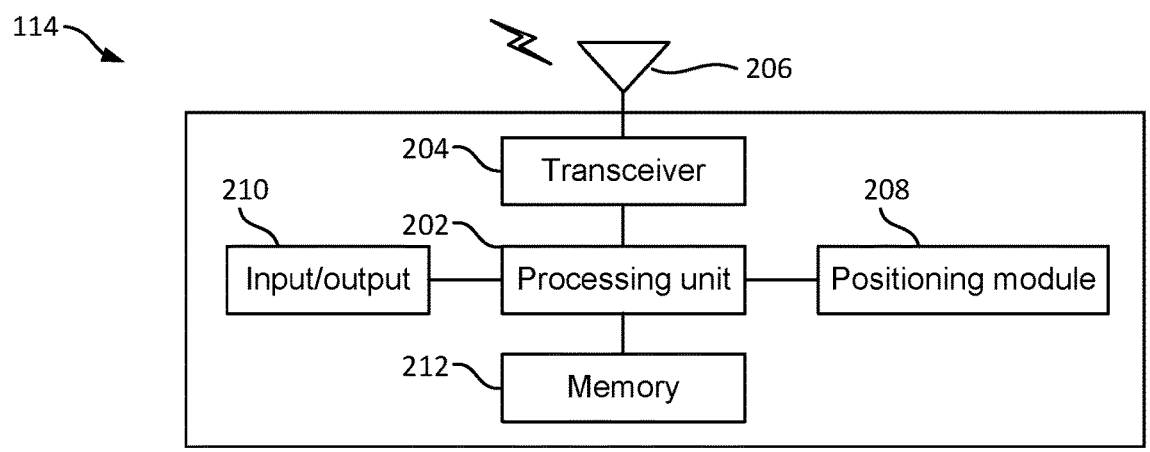
FIG. 4 is a simplified schematic diagram of a user equipment (UE) of the communication system shown in FIG. 1.

FIG. 4 is a simplified schematic diagram of a UE 114. As shown, the UE 114 comprises at least one processing unit or processor 202 and at least one transceiver 204. Optionally the UE 114 may further comprise at least one antenna or network interface controller (NIC) 206, at least one positioning module 208, one or more input/output components 210, and at least one memory 212.

The processing unit 202 is configured for performing various processing operations such as signal coding, data processing, power control, input/output processing, or any other functionalities to enable the UE 114 to join the communication system 100 and operate therein. The processing unit 202 may also be configured to implement some or all of the functionalities and/or embodiments of the UE 114 described in this disclosure. The processing unit 202 may comprise a microprocessor, a microcontroller, a digital signal processor, a FPGA, or an ASIC. Examples of the processing unit 202 may be an ARM© microprocessor (ARM is a registered trademark of Arm Ltd., Cambridge, UK) manufactured by a variety of manufactures such as Qualcomm of San Diego, Calif., USA, under the ARM© architecture, an INTEL© microprocessor (INTEL is a registered trademark of Intel Corp., Santa Clara, Calif., USA), an AMD© microprocessor (AMD is a registered trademark of Advanced Micro Devices Inc., Sunnyvale, Calif., USA), and the like.

The at least one transceiver 204 may be configured for modulating data or other content for transmission by the at least one antenna 206. The transceiver 204 is also configured for demodulating data or other content received by the at least one antenna 206. Each transceiver 204 may comprise any suitable structure for generating signals for wireless transmission and/or processing signals received wirelessly. Each antenna 206 may comprise any suitable structure for transmitting and/or receiving wireless signals. Although shown as a single functional unit, a transceiver 204 may be implemented separately as at least one transmitter and at least one receiver.

The positioning module 208 is configured for communicating with a plurality of global or regional positioning anchors such as navigation satellites, for example, satellites of a global navigation satellite system (GNSS) such as the Global Positioning System (GPS) of USA, Global'naya Navigatsionnaya Sputnikovaya Sistema (GLONASS) of Russia, the Galileo positioning system of the European Union, and/or the Beidou system of China. The navigation satellites may also be satellites of a regional navigation satellite system (RNSS) such as the Indian Regional Navigation Satellite System (IRNSS) of India, the Quasi-Zenith Satellite System (QZSS) of Japan, or the like. The positioning module 208 may use the transceiver 204 and antenna 206 for communicating with the positioning anchors, or may comprise separate transceiver and antenna for communicating with the positioning anchors.

The one or more input/output components 210 is configured for interaction with a user or other devices in the system 100. Each input/output component 210 may comprise any suitable structure for providing information to or receiving information from a user and may be, for example, a speaker, a microphone, a keypad, a keyboard, a computer mouse, a display, a touch screen, a network communication interface, and/or the like.

The at least one memory 212 is configured for storing instructions executable by the processing unit 202 and data used, generated, or collected by the processing unit 202. For example, the memory 212 may store software instructions or modules executable by the processing unit 202 for implementing some or all of the functionalities and/or embodiments of the UE 114 described herein. Each memory 212 may comprise any suitable volatile and/or non-volatile storage and retrieval components such as RAM, ROM, hard disk, optical disc, SIM card, solid-state memory modules, memory stick, SD memory card, and/or the like.

Those skilled in the art will appreciate that in various embodiments, the devices or apparatuses described above (such as the TRPs 102 and/or UEs 114) may be implemented as separate devices, or alternatively as components or modules (such as one or more chipsets or circuits) of one or more other suitable devices. Similarly, the devices, apparatuses, components, and/or modules described in greater details below may be implemented as separate devices in some embodiments, or as components or modules (such as one or more chipsets or circuits) of one or more other suitable devices in some other embodiments.

B. Trp Communication Using Orbital Angular Momentum Beams

In some embodiments, the TRPs 102 may use orbital angular momentum (OAM) beams to communicate with the communication network 104 and/or other TRPs 102 using point-to-point communications. As those skilled in the art will appreciate, an OAM beam is a directional electromagnetic (EM) wave (such as an EM wave with a wavelength in the millimeter (mm) range) which has a wavefront with helical phase. OAM beams with different OAM charge may be multiplexed on the same spectrum resource due to their orthogonality in the spatial domain. Hence, an OAM mode multiplexing (OAM-MM) system benefits from spatial multiplexing gain without the need for applying complex precoding methods. For ease of description, the communication system 100 using OAM beams and OAM-MM is also denoted an OAM-MM system hereinafter.

Despite their spectral efficiency (SE) improvement capabilities, the performance of OAM-MM systems degrades severely in the presence of antenna misalignment.

Existing solutions to solve the OAM antenna misalignment problem can be divided into three categories. First, to estimate the misalignment parameters followed by the physical adjustment of the antennas (see References [R1] to [R3]). This approach is particularly undesirable from the practical standpoint as continuous access to the antenna is required. The second category includes the solutions using digital signal processing (DSP) techniques (see References [R4] to [R8]). For instance, by adding the pilot signals with the purpose of estimating the misaligned channel matrix followed by designing the precoding or combining matrices that compensate the misalignment effect in the baseband. Although DSP techniques may be effective in the compensation of the misalignment effect, such DSP techniques are often complex and thus are in direct contradiction to the main advantage of using OAM-MM, that is, small baseband processing requirement compared to MIMO systems. The third category of misalignment compensation techniques includes the analog-only solutions (see References [R9] and [R10]), which, with limited number of works so far, offer beamforming (BF) techniques that are implemented in the analog domain to compensate for the antenna misalignment, thereby avoiding the high computational and high processing requirements of the DSP-based solutions.

In the OAM-MM system 100, the two parties of a communication link are denoted as a transmitter (Tx) which transmits an OAM beam bearing a signal, and a receiver (Rx) which receives the signal-bearing OAM beam transmitted from the transmitter. For example, when two TRPs 102 are communicating with each other via an OAM beam, one of the TRPs that transmits the signal-bearing OAM beam is the transmitter and the other TRP that receives the signal-bearing OAM beam is the receiver. When a TRP 102 is in communication with the communication network 104 via an OAM beam, one of the TRP 102 and the communication network 104 that transmits the signal-bearing OAM beam is the transmitter and the other of the TRP 102 and the communication network 104 that receives the signal-bearing OAM beam is the receiver.

Figure 5A:
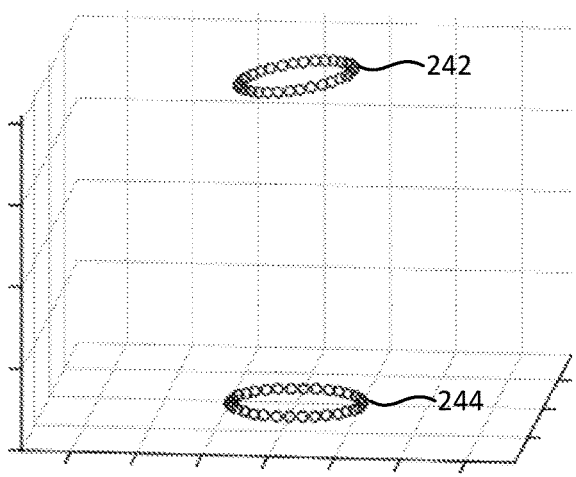
Figure 5B:
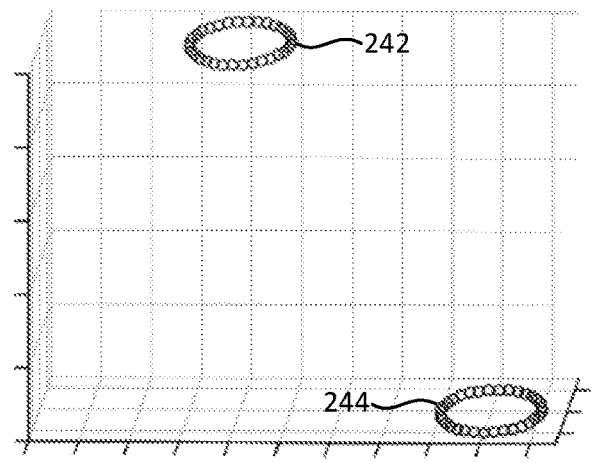
Figure 5C:
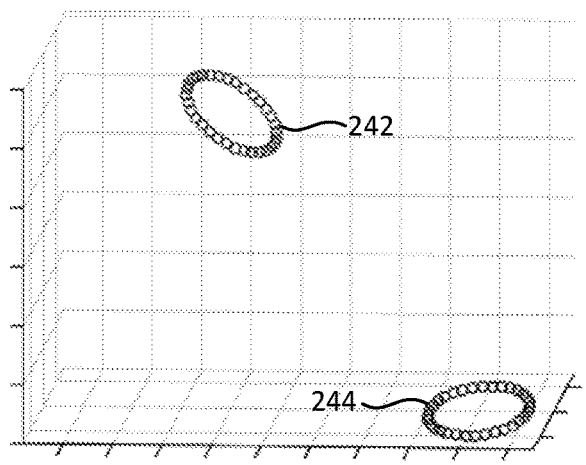

In OAM-based wireless communications, antennas of the transmitter and the receiver (denoted "transmitting antenna" and "receiving antenna" hereinafter, respectively) are generally required to align with each other along a line-of-sight. While the antennas of the TRPs 102 and the communication network 104 may be deployed at fixed locations towards fixed directions for forming point-to-point communication links therebetween, antenna misalignment is a common issue in practice, which may be caused by various reasons such as harsh weather conditions or human errors during the installation process. FIGS. 5A to 5C show some examples of antenna misalignment types between a transmitter 242 and a receiver 244 in a uniform circular array (UCA) based OAM-MM system, wherein FIG. 5A shows the non-parallel antenna-misalignment type (that is, the axes of the transmitter 242 and receiver 244 are aligned but the directions thereof are non-parallel), FIG. 5B shows the off-axis antenna-misalignment type (that is, the directions of the transmitter 242 and receiver 244 are parallel but the axes thereof are unaligned), and FIG. 5C shows the transmitter 242 and receiver 244 with a combined antenna-misalignment type of both non-parallel and off-axis antenna-misalignments. Antenna misalignment results in the loss of orthogonality between OAM beams and subsequently results in the interference between different modes, thereby causing an effect known as inter-mode interference (IMI). The spectral efficiency (SE) of an OAM-MM system 100 affected by IMI may decrease significantly compared to a perfectly aligned system (that is, the one without IMI).

In the following, various embodiments are described wherein the IMI caused by the antenna misalignment may be compensated without sacrificing the key advantages of the OAM-MM architecture. Such constraint dictates a solution without requiring complex digital signal processing (DSP). More specifically, in the OAM-MM systems 100 described herein, various methods and algorithms may be used to compensate the IMI caused by the misalignment through analog beamforming (BF) followed by a simple detection method in the baseband. By applying the methods disclosed herein, the gap between the sum-rate of the misaligned OAM-MM system 100 (that is, the summation of the achievable rates of the misaligned OAM-MM system 100) and the capacity of the OAM-MM system 100 may be decreased significantly.

Without loss of generality, the following embodiments describe examples focusing on methods for compensating or mitigating the IMI caused by the non-parallel or off-axis antenna-misalignment. With these examples, the methods for compensating or mitigating the IMI caused by both non-parallel and off-axis antenna-misalignments are straightforward.

Herein, the positions and directions of the transmitting and receiving antennas are generally fixed. For example, while the directions (and sometimes the positions) of the transmitting and receiving antennas may be changed by weather conditions such as wind, the changed directions/positions may still be considered generally fixed after the weather conditions are over.

In some embodiments, the OAM-MM system 100 uses a misalignment-mitigation method which comprises designing a BF codebook and a detection method. The BF codebook contains a plurality of BF vectors required to compensate for the IMI caused by the antenna misalignment. As the positions and directions of the transmitting and receiving antennas are generally fixed, the BF codebook may be designed offline. During real-time operation, the receiver may choose and apply the correct BF vector to the received signals.

In the baseband, the receiver comprises a successive interference cancellation (SIC) module for applying a SIC method to extract the transmitted signals. The BF codebook is designed such that it provides the appropriate input signal to the SIC module. In particular, after applying the designed BF vector, the signals are sorted from the lowest to highest signal-to-noise ratios (SNRs).

Figure 6:
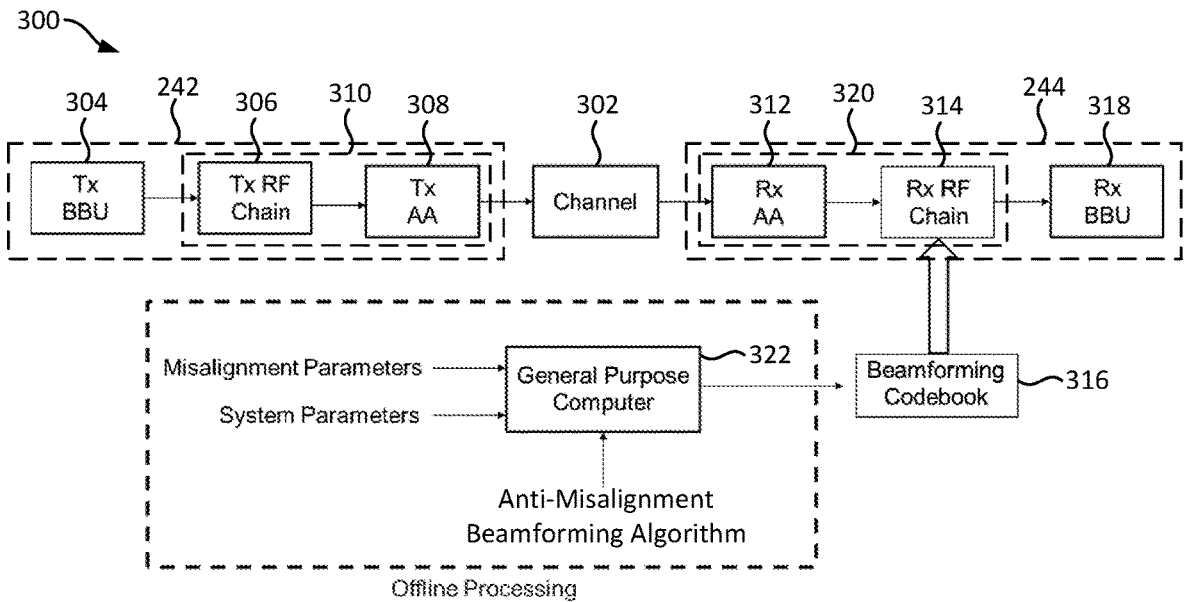
FIG. 6 is a block diagram showing a transmitter and a receiver of a UCA-based OAM-MM system in communication with each other via a wireless channel, according to some embodiments of this disclosure.

FIG. 6 is a block diagram 300 showing a transmitter 242 and a receiver 244 in communication with each other via a wireless channel 302. The transmitter 242 comprises a transmitter-side baseband unit (BBU) 304 for generating a baseband signal and sends the baseband signal to one or more transmitter-side RF chains or RF-signal processing modules 306. Each transmitter-side RF chain 306 may comprise various components such as amplifiers, filters, mixers, attenuators, detectors, and/or the like for converting the baseband signal to a signal-bearing OAM beam and sending the signal-bearing OAM beam to a transmitter-side antenna array (AA) 308 (also denoted a "transmitting antenna array" hereinafter) for transmission through the wireless channel 302. In these embodiments, the transmitter-side RF chain 306 and the transmitting antenna array 308 form the front-end 310 of the transmitter 242 operating in RF bands. The wireless channel 302 is a line-of-sight (LoS) channel.

The receiver 244 comprises a receiver-side antenna array 312 (also denoted a "receiving antenna array" hereinafter) for receiving the signal-bearing OAM beam, which is processed by one or more receiver-side RF chains 314. Each RF chain 314 uses the BF codebook 316 for IMI mitigation, and the IMI-mitigated signal is sent to a receiver-side BBU 318 which uses the SIC operation (not shown in FIG. 6) to extract the transmitted signals. In these embodiments, the receiving antenna array 312 and the receiver-side RF-chain 314 form the front-end 320 of the receiver 244 operating in RF bands.

As described above, the construction of the BF codebook 316 is an offline process performed by a suitable computing device 322 such as a general-purpose computer using an anti-alignment BF method based on at least one of the misalignment type, one or more misalignment parameters, and/or one or more system parameters.

In some embodiments, the BF codebook 316 may be constructed individually for each transmitter/receiver pair via an offline process. As those skilled in the art will understand, the "offline process" refers to a process that does not need to be performed during the above-described signal-receiving process (including signal receiving, IMI mitigation, and transmitted-signal retrieving). For example, the BF codebook 316 may be constructed prior to the signal-receiving process and the signal-receiving process may simply using the BF codebook 316 for IMI mitigation. In some embodiments, the BF codebook 316 may be constructed individually for each transmitter/receiver pair dynamically and/or in real-time via an "online" process. In other words, the construction of the BF codebook 316 may be performed during the above-described signal-receiving process and then the constructed BF codebook 316 is used for IMI mitigation.

In some embodiments, the one or more misalignment parameters may not be known at the time of constructing the BF codebook 316. Therefore, a set of potentially suitable parameter values (such as a set of commonly used parameter values) are used, and the BF vectors corresponding to those parameters are built and included in the BF codebook 316. Such a set of potentially suitable parameter values may be pre-built based on, for example, experiments of antenna misalignments in various scenarios, historical data related to antenna misalignments in various scenarios, and/or the like.

C. Construction of BF Codebook

Figure 7:
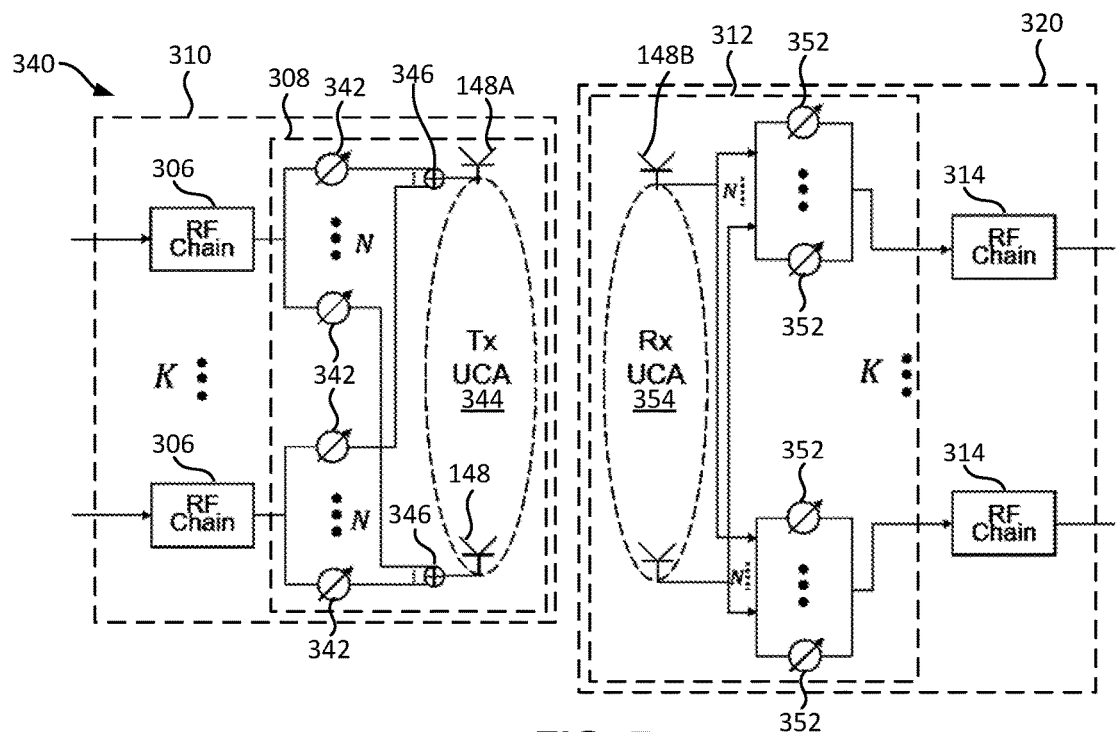
FIG. 7 is a block diagram showing the system model of the front-ends of the transmitter and the receiver shown in FIG. 6.

In some embodiments, the OAM-MM system 100 is a UCA-based OAM-MM system. FIG. 7 is a block diagram showing the system model 340 of the front-end 310 of the transmitter 242 and the front-end 320 of the receiver 244 of the UCA-based OAM-MM system 100 in communication with each other via a LoS channel (not shown). As shown, the front-end 310 of the transmitter 242 comprises K (K≥1) RF chains 306 and a transmitting antenna array 308 which comprises NK (N≥1) phase shifters (PSs) 342 (forming K phase-shifter groups) and a transmitting UCA 344. The phase shifters 342 are used for generate an OAM beam. Each RF chain 306 is connected to a phase-shifter group of Nphase shifters 342 for multiplexing data signals to the OAM beam. The transmitting UCA 344 comprises N transmitting antennas or transmitting antenna elements 148A each connected to a phase shifter 342 of each phase-shifter group (that is, each transmitting antenna element 148A of the transmitting UCA 344 connected to a total of K phase shifters 342), for transmitting the signal-bearing OAM beam through a LoS channel (not shown). Thus, each transmitting antenna element 148A of the transmitting UCA 344 combines, for example, adds (represented by the adders 346 in FIG. 7) the outputs of the K phase shifters 342 (each from a phase-shifter group).

Similarly, the front-end 320 of the receiver 244 comprises K (K≥1) RF chains 314 and a receiving antenna array 312 which comprises NK (N≥1) phase shifters 352 (forming K phase-shifter groups) and N receiving antennas or receiving antenna elements 148B forming a receiving UCA 354 for receiving the OAM beam. Each RF chain 314 is connected to a phase-shifter group of N phase shifters 352, and each receiving antenna element 148B of the receiving UCA 354 is connected to a phase shifter 352 of each phase-shifter group (that is, each receiving antenna element 148B of the receiving UCA 354 is connected to a total of K phase shifters 352).

In RF bands, the OAM beam is generated by the transmitting UCA 344. In particular, to generate K OAM modes from N possible OAM modes using the N-element transmitting UCA 344, the NK phase shifters 342 (also denoted the "BF network" hereinafter and identified using reference numeral 342) apply the phase shift $l_k \varphi_n$ (k=1, ..., K, and 0≤$l_k$≤N−1) on the n-th transmitting antenna element 148A of the transmitting UCA 344, where 0≤n≤N−1, $\varphi_n$=2π/Nn, and $l_1, \ldots, l_K$ are K numbers selected from 0, ..., N−1, for example, in some embodiments, $l_1, \ldots, l_K$=1, ..., K.

By multiplexing K data signals (denoted by s, which are from the K RF chains) using an N-element OAM-generating transmitting UCA 344, the multiplexed signal vector x is x=Vs, where V is a matrix of the phase shifts $\varphi_n$ of the transmitting BF network 342 and $$V = [\exp(jl_k\varphi_n)]_{\substack{n=0,\ldots,N-1 \\ k=1,\ldots,K}} = \begin{bmatrix} \exp(jl_1\varphi_0) & \ldots & \exp(jl_K\varphi_0) \\ \vdots & & \vdots \\ \exp(jl_1\varphi_{N-1}) & \ldots & \exp(jl_K\varphi_{N-1}) \end{bmatrix}.$$

where expo is the exponential function and $j=\sqrt{-1}$.

The elements of the LoS channel between the transmitting and receiving UCAs 344 and 354 at both ends of the transmission are obtained using the following relationship:

$$h_{ij} = \beta \frac{\lambda}{4\pi d_{ij}} e^{-j\frac{2\pi}{\lambda}d_{ij}}. \tag{1}$$

where $h_{ij}$ is the (i,j)-th element of N×N channel matrix $\bar{H}$ of the LoS channel between the transmitting and receiving UCAs 344 and 354 (which may be misaligned), $d_{ij}$ is the distance between the i-th receiving antenna element 148B at the receiver 244 and the j-th transmitting antenna element 148A at the transmitter 242, $\lambda$ is the wavelength of the OAM signal, and $\beta$ is a constant.

Each receiving antenna 148B receives a copy of the OAM beam. When the transmitting and receiving antennas 148A and 148B are perfectly aligned, the geometry of UCA-based OAM-MM system imposes a circulant channel matrix $H_A$. By using the discrete Fourier transform (DFT) decomposition of circulant matrices, the circulant channel matrix $H_A$ may be represented as $H_A F_N^H \nabla F_N$, where $F_N$ is the normalized DFT matrix, $F_N^H$ is the conjugate-transpose (also called "Hermitian-transpose") of $F_N$, and Λ is a diagonal matrix. At the receiver side, the DFT-based analog BF network (which is the same as $F_N$) is applied. Hence, the received signal vector at the baseband, denoted by $y_A$, is calculated as follows:

$$y_A = \nabla Ps + n. \tag{2}$$

In Equation (2), P is the power allocation matrix, s is a K-dimensional (K being the number of multiplexed data streams) vector of data signals before multiplexing, and n is the vector of independent and identically distributed (i.i.d.) thermal noise samples at the receiver RF chains, where $n \sim N(0, \sigma_n^2 I_K)$, that is, each element of n follows a Gaussian distribution with variance $\sigma_n^2$.

In the presence of the antenna misalignment, the parameter $d_{ij}$ in Equation (1) takes a different form when compared to an aligned system. Consequently, the channel matrix loses its circular symmetry property and the DFT decomposition cannot be applied. Hence, the "simple" DFT-based BF at the receiver will not be optimal. In these embodiments, the DFT-based BF is replaced with a BF codebook that takes the effect of antenna misalignment into consideration.

The normalized LoS channel matrix in the misaligned system is denoted by $\bar{H}$. Since $\bar{H}$ is not circulant anymore, an alternative method to DFT-based BF is used. Herein, the BF coefficients of the alternative method are the elements of a receiver BF matrix W. The received signal vector at the baseband of misaligned system after applying the receiver BF matrix W is expressed as follows:

$$y = W^H \bar{H} V S + \bar{n}. \tag{3}$$

In Equation (3), $V = F_N^H P$, $\bar{n} = W^H n$, and thus $\bar{n} \sim N(0, \sigma_n^2 WW^H)$.

The model in Equation (3) is similar to a conventional point-to-point MIMO system, for which the singular value decomposition (SVD) precoding with water-filling power allocation is capacity achieving. However, in the OAM-MM system, the transmitting BF matrix V is determined by the multiplexed OAM modes and is fixed. The receiver BF matrix W, on the other hand, may be implemented using phase shifters only. The matrix W may be designed under the aforementioned constraint such that the overall sum-rate of the system approaches the capacity of equivalent MIMO system. Note that for every antenna misalignment parameter, a dedicated matrix W is designed. By collecting all these matrices into a codebook, the appropriate receiver BF matrix W may be called or selected from the codebook based on the misalignment parameters and type. As those skilled in the art will appreciate, in some embodiments, such the misalignment parameters and type may be determined by using a misalignment determination process performed at an initialization stage and may be further performed periodically or when needed.

In these embodiments, the combined channel matrix H combining the misaligned channel matrix and transmitting BF matrix is defined as follows:

$$H \triangleq \bar{H}V = \bar{H}F_N^H P, \tag{4}$$

where $H=[h_0, \ldots, h_{K-1}]$. By using $W=[w_0, \ldots, w_{K-1}]$, the k-th received signal in Equation (4), denoted by $y_k$, may be expressed as follows:

$$y_k = w_k^H h_k s_k + w_k^H \left( \sum_{\substack{m=0 \\ m \neq k}}^{K-1} h_m s_m \right) + n_k, \tag{5}$$

where $n_k = w_k^H n$ is the k-th element in n.

The signal model in Equation (5) is similar to that of multi-user-MIMO (MU-MIMO) detection problem. As the QR decomposition followed by the SIC is an effective approach in MU-MIMO detection, it may be used to solve the mode decomposition in the misaligned OAM-MM system. The desired BF matrix W is derived after applying the QR method, as it is explained in the following.

The QR-decomposition is one of the most effective approaches used in the MU detection. In the following, the QR-base detection method is applied on the misaligned OAM-MM systems. In these embodiments, H includes the combined effect of the misaligned channel and the transmitting BF V. This is because V is a fixed parameter for the OAM-MM systems, and its effect on the signals may be combined with the channel, that is, H. Using the QR-decomposition, H may be decomposed as H=QR where Q is an N×N unitary matrix, while R is N×K upper triangular.

The conventional QR-based detection uses Q as the receiver combiner to obtain $y_c = Rs + n$. Since R is upper triangular, by starting from K-th (last) signal and going backward, at each step the interference may be removed using the previously detected symbols, that is, the SIC operation. The SIC is built on the assumption of correct prior decisions. Therefore, the possibility of error propagation exists. In these embodiments, the minimum mean squared error (MMSE) sorted QR decomposition is used with the post-sorting algorithm (called "sorted-QR" (SQR) hereinafter) described in Reference [R11], which is generally to minimize $r_{KK}$ (that is, the (K, K)-th element in R) in the order of calculation (1, ..., K) rather than maximizing it in the order of detection (K, ..., 1).

The SQR algorithm or method decomposes the augmented channel matrix $\hat{H}$, which is the combination of the channel H and the i.i.d. noise, and $\hat{H} = [H^T, \sigma_n I_K^T]T$ is an (N+K)×K matrix (wherein the superscript T represents transpose, and $\sigma_n I_K^T$ is the covariance matrix of the additive noise (where the noise samples are i.i.d. Gaussian)). The augmented channel matrix $\hat{H}$ is decomposed as:

$$\hat{H} = \hat{Q}\hat{R} = \begin{bmatrix} Q_1 \\ Q_2 \end{bmatrix} \hat{R}. \qquad (6)$$

where $\hat{Q}$ is an orthogonal matrix and $\hat{R}$ is an upper triangular matrix. $Q_1$ is the upper portion of $\hat{Q}$ having the same number of rows as H, and $Q_2$ is the lower portion of $\hat{Q}$ having the same number of rows as $\sigma_n I_K$. In other words, $Q_1$ is an N×K matrix and $Q_2$ is a K×K matrix.

By choosing $W=Q_1$, and then combining Equations (3), (4), and (6), the following formula is obtained:

$$y_S = \hat{R}s - \sigma_n Q_2^H s + Q_1^H n. \qquad (7)$$

The signal vector $y_s$ in Equation (7) is the input to the SIC block in baseband, which carries out the data detection task. To apply the designed BF matrix $W=Q_1$ in the RF domain and avoid the limitations in the majority of prior art, the following Lemma described in Reference [R12] is used:

Lemma 1: Each element of $\hat{Q}$ in Equation (6) can be expressed as the summation of two unit-magnitude complex numbers $\hat{Q}_A$ and $\hat{Q}_B$. For the (k, m)-th element of $\hat{Q}$, denoted by $q_{km}$, where $q_{km}=\alpha_{km}e^{j\beta_{km}}$, the following relationship holds:

$$q_{km} = e^{j[\cos^{-1}(\frac{\alpha_{km}}{2})+\beta_{km}]} + e^{j[-\cos^{-1}(\frac{\alpha_{km}}{2})+\beta_{km}]}. \qquad (8)$$

where $e^{j[\cos^{-1}(\alpha_{km}/2)+\beta_{km}]}$ is the (k, m)-th element of $\hat{Q}_A$ and $e^{j[-\cos^{-1}(\alpha_{km}/2)+\beta_{km}]}$ is the (k, m)-th element of $\hat{Q}_B$.

By using the above lemma, a method (denoted "Algorithm 1", written in a pseudo-code form) is used to ensure that the receiver BF matrix can be implemented in RF domain.

---

Algorithm 1 Implementing $Q_1$ Using phase shifters (PSs)

---

Input: $\hat{Q}$ and $Q_1$ in Equation (6)
Execute the steps of:
1: Use Lemma 1 to obtain $\hat{Q} = \hat{Q}_A + \hat{Q}_B$
2: Partition $\hat{Q}_A$ as $\hat{Q}_A = [Q_{A1}^T, Q_{A2}^T]^T$, where $Q_{A1}$ is of same size as $Q_1$
3: Repeat Step 2 for $\hat{Q}_B$ to calculate $Q_{B1}$ and $Q_{B2}$
4: return $Q_{A1}, Q_{B1}$

---

From what has been explained above, the BF matrix may be designed for a given misaligned system. In the following, the BF codebook construction process is described.

Figure 8A:
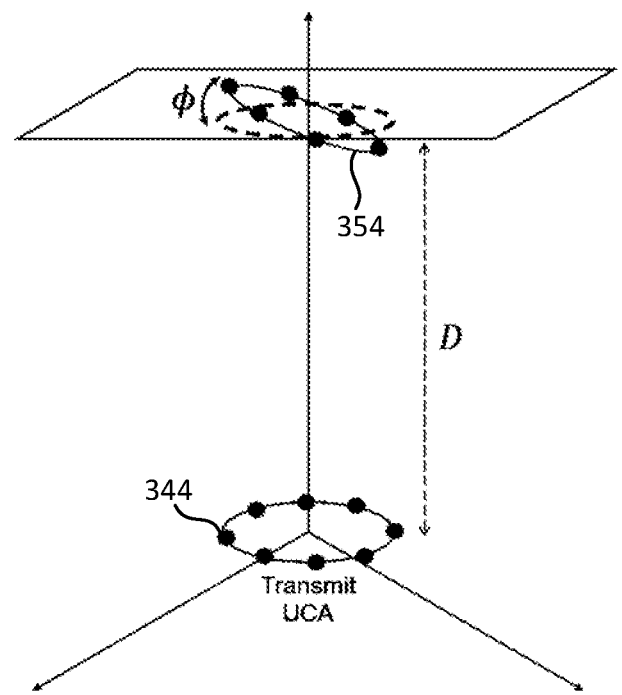
FIGS. 8A and 8B show the required parameters to characterize the non-parallel antenna-misalignment (FIG. 8A) and the off-axis antenna-misalignment (FIG. 8B)
Figure 8B:
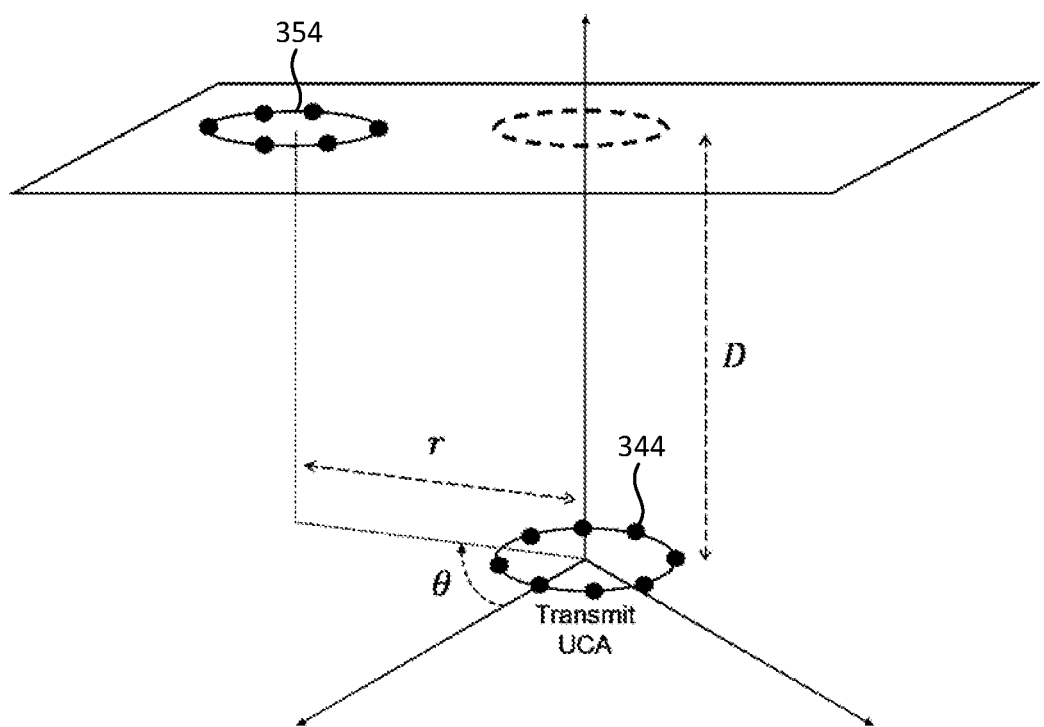

To construct a BF codebook, all the misalignment scenarios of interest may be identified. FIGS. 8A and 8B show the required parameters to characterize each of the two misalignment types, that is, the non-parallel antenna-misalignment (FIG. 8A) and the off-axis antenna-misalignment (FIG. 8B). For the non-parallel misalignment shown in FIG. 8A, the rotation angle or non-parallel angle of the receiving UCA 354 with respect to the plane parallel to the transmitting UCA 344, denoted by p, completely parametrizes the antenna misalignment. For the off-axis type shown in FIG. 8B, the two coordinates of the center of the receiving UCA 354 in a cylindrical coordinate system (for example, the cylindrical coordinate system having the origin at the center of the transmitter UCA 354), namely, the off-axis distance r and the off-axis angle θ, suffice to parametrize the antenna misalignment. In both cases, the transmission distance D is fixed. Thus, the one or more misalignment parameters may comprise at least one of ϕ, r, and/or θ.

Each misalignment parameter results in a different misaligned-channel $\underline{H}$ and needs to be considered separately. The maximum of misalignment parameters' values are design parameters and may be chosen according to the available memory size. In practice, these parameters are limited to values corresponding to areas in the close vicinity of the antenna 148.

To obtain a finite number of BF vectors, a maximum value for each of the aforementioned misalignment parameters may be chosen. These maximum values are denoted by ϕ*, r*, and θ*. Then, the values of misalignment parameters are discretized to a total of $N_{OA}$, $N_{NPr}$, and $N_{NPt}$ values smaller than or equal to the maximum values ϕ*, r*, and θ*, respectively. In other words, the possible values of the non-parallel angle ϕ may be discretized to $N_{OA}$ values between 0 and ϕ*, the possible values of the off-axis distance r may be discretized to $N_{NPr}$ values between 0 and r*, and the possible values of the off-axis angle θ may be discretized to $N_{NPt}$ values between 0 and θ*. For ease of description, the non-parallel angle ϕ is denoted the non-parallel parameter set characterizing the non-parallel misalignment, and the combination of the off-axis distance r and the off-axis angle θ is denoted the off-axis parameter set characterizing the off-axis misalignment. Accordingly, each value of the non-parallel angle ϕ is denoted a parameter-value set of the non-parallel parameter set, and each combination of the values of the off-axis distance r and the off-axis angle θ is denoted a parameter-value set of the off-axis parameter set.

By calculating $\overline{H}$ and H corresponding to each parameter-value set, the SQR-based BF may be applied. All the calculated BF matrices are collected in the set W, that is, the BF codebook.

In W, the phase shifters are represented by a limited number of quantization bits, for example, B bits. To quantize φ, when implementing $e^{j\varphi}$, the uniform quantization is applied as follows:

$$\hat{\varphi} = \arg\min_{l \in \{0,\ldots,2^B-1\}} \left|\varphi - \frac{2\pi}{2^B}l\right|. \qquad (9)$$

The following method (denoted "Algorithm 2", written in a pseudo-code form) may be used to build the misalignment-robust BF codebook, W.

---

Algorithm 2 Constructing the misalignment-robust
BF codebook

---

Input: ϕ*, r*, θ*, $N_{OA}$, $N_{NPr}$, $N_{NPt}$, B, λ, N, K, $\sigma_n$, P
Output: W
Execute the steps of:
1: Let W = ∅, where ∅ is the null set.

2: Let $\phi_p = \left\lfloor \dfrac{\phi^*}{N_{OA}} \right\rfloor p, \forall\, 0 \le p < N_{OA}$ 3: Let $r_q = \left\lfloor \dfrac{r^*}{N_{NPr}} \right\rfloor q, \forall\, 0 \le q < N_{NPr}$ 4: Let $\theta_l = \left\lfloor \dfrac{\theta^*}{N_{NPt}} \right\rfloor l, \forall\, 0 \le l < N_{NPt}$

| Algorithm 2 Constructing the misalignment-robust BF codebook |
|---|
| 5:   for p = 1 to $N_{OA}$ do |
| 6:     Given $\phi_p$, calculate the misaligned channel, $\overline{H}_p$, using Equation (1), |
| 7:     Let $\hat{H}_p = [H_p^T, \sigma_n I_K^T]^T$, where $H_p = \overline{H}_p F_N^H P$ |
| 8:     Apply the SQR-based BF design to obtain $\hat{Q}_p$, where $\hat{Q}_p = [Q_{1p}^T, Q_{2p}^T]^T$ |
| 9:     Use $Q_{1p}^T$ and Algorithm 1, to obtain matrices of phase shifters (PSs), $Q_{A1p}$ and $Q_{B1p}$ |
| 10:     Quantize the arguments of the elements in $Q_{A1p}$ and $Q_{B1p}$ using Equation (9) to obtain $W_p^{(A)}$, and $W_p^{(B)}$, respectively |
| 11:     Add $W_p^{(A)}$, and $W_p^{(B)}$ to W |
| 12:   end for |
| 13:   for q = 1 to $N_{NPr}$ do |
| 14:     for l = 1 to $N_{NPt}$ do |
| 15:       Given $r_q$ and $\theta_l$, calculate the misaligned channel, $\overline{H}_{ql}$, using Equation (1) |
| 16:       Replace p with ql and perform Steps 7-10 to obtain $W_{ql}^{(A)}$, and $W_{ql}^{(B)}$ |
| 17:       Add $W_{ql}^{(A)}$, and $W_{ql}^{(B)}$ to W |
| 18:     end for |
| 19:   end for |
| 20:   return W | where ∀ represents "for any".

FIGS. 9A and 9B summarize and generalize the BF-codebook generation process 400 corresponding to the Algorithm 2. As shown in FIG. 9A, the space around the antenna and accordingly the misalignment parameters are discretized (blocks 402 and 404; corresponding to steps 2 to 4 of Algorithm 2), and such discretizations are taken into account in determining the geometry of antenna (block 406) and the misalignment types and parameters (block 408), which are then used in phase shifter calculation (block 410).

As described above, the misalignment types include non-parallel antenna-misalignment (having the parameter of the non-parallel angle $\phi$) and the off-axis antenna-misalignment (having the parameters of the off-axis distance r and the off-axis angle $\theta$). At block 404, the parameters $\phi$, r, and $\theta$ are discretized into a total of $N_{OA}$, $N_{NPr}$, and $N_{NPt}$ values or levels smaller than or equal to the maximum values $\phi^*$, $r^*$, and $\theta^*$, respectively.

As shown in FIG. 9B, which shows the detail of block 410, the phase shifting values of the phase shifters are calculated for each misalign type and each parameter-value set thereof (that is, for each discretized $\phi$ (denoted $\phi_p$ in Algorithm 2) for the non-parallel antenna-misalignment, and for each combination of discretized r and $\theta$ (denoted $r_q$ and $\theta_l$ in Algorithm 2) for the off-axis antenna-misalignment).

More specifically, for each parameter-value set, the corresponding misaligned channel $\overline{H}$ is calculated using Equation (1) (block 412; corresponding to step 6 of Algorithm 2 for $\phi_p$ and step 15 for the combined $r_q$ and $\theta_l$ in Algorithm 2). Note that, compared to the description below, Algorithm 2 adds subscriptions p and ql to some symbols (for example, H is denoted $\overline{H}_p$ and $\overline{H}_{ql}$) to explicitly indicate that the symbols with subscriptions p and ql correspond to the parameter $\phi_p$ and the combined parameter $r_q$ and $\theta_l$, respectively. Such indicates are implied in the description below.

At block 414 (corresponding to steps 7 and 8 of Algorithm 2), the SQR method is used to decompose an augmented channel matrix $\hat{H}$ (which is the aggregation of the combined channel matrix $H = \overline{H} F_N^T P$ (combining the misaligned channel matrix and transmitting BF matrix) and the covariance matrix of the additive noise, and $\hat{H} = [H^T, \sigma_n I_K^T]$, where $H = \overline{H} F_N^T P$) to obtain $\hat{Q} = [Q_1^T, Q_2^T]^T$ using Equation (6).

At block 416 (corresponding to steps 9 to 11 and 16 to 17 of Algorithm 2), Algorithm 1 is used to obtain unit-magnitude elements (represented as matrices $Q_{A1}$ and $Q_{B1}$) based on $\hat{Q}$ and $Q_1$, wherein the phases $\varphi$ of the unit-magnitude elements are the phase shifting values for the parameter-value set. The obtained phase shifting values are quantized using Equation (9) to obtain $W^{(A)}$ (corresponding to $Q_{A1}$) and $W^{(B)}$ (corresponding to $Q_{B1}$) which are then added to the BF codebook.

In particular, at block 416, $\hat{Q}$ is first partitioned to $\hat{Q} = \hat{Q}_A + \hat{Q}_B$, where the (k, m)-th element of $\hat{Q}$ is $\alpha_{km} e^{j\beta_{km}}$, and the (k, m)-th elements of $\hat{Q}_A$ and $\hat{Q}_B$ are unit-magnitude elements $e^{j[\cos^{-1}(\alpha_{km}/2)+\beta_{km}]}$ and $e^{-j[\cos^{-1}(\alpha_{km}/2)+\beta_{km}]}$, respectively (step 1 of Algorithm 1). Then, $\hat{Q}_A$ is partitioned as $\hat{Q}_A [Q_{A1}^T, Q_{A2}^T]^T$, where $Q_{A1}$ has the same size as $Q_1$ (step 2 of Algorithm 1) and $\hat{Q}_B$ is partitioned as $\hat{Q}_B = [Q_{B1}^T, Q_{B2}^T]^T$ where $Q_{B1}$ has the same size as $Q_1$ (step 3 of Algorithm 1). The phases p of the elements of $Q_{A1}$ and $Q_{B1}$ are quantized using Equation (9) to obtain $W^{(A)}$ (corresponding to $Q_{A1}$) and $W^{(B)}$ (corresponding to $Q_{B1}$) which are then added to the BF codebook.

Upon constructing the BF codebook, the constructed BF codebook is used (instead of the conventionally used OAM receiver BF). FIG. 10 shows the system block diagram after replacing the DFT-based BF with the codebook-based approach disclosed herein, wherein a control unit (not shown) selects the suitable BF vector based on the misalignment type and misalignment parameter(s). Those skilled in the art will appreciate that misalignment parameters may be found, for example, through the estimation methods used for angle of arrival estimation.

The following method (denoted "Algorithm 3", written in a pseudo-code form) may be used to use the selected phase-shift values (as matrices $Q_{A1}$ and $Q_{B1}$) for shifting the phases of the copies of the received signal.

| Algorithm 3 Phase Shifting Using Phase Shifters (PSs) |
|---|
| Input: $Q_{A1}$, $Q_{B1}$ |
| Execute the steps of: |
| 1:   for n = 1 to N do |
| 2:     for k = 1 to K do |
| 3:       Use two PSs to apply $[Q_{A1}]_{nk}$ and $[Q_{B1}]_{nk}$ on the desired signal |
| 4:       Add the results from Step 3 to obtain the signal after applying $[Q_1]_{nk}$ |
| 5:     end for |
| 6:   end for |

In the practical systems, the misalignment parameters may be estimated with a certain level of accuracy. In other words, the estimation of misalignment parameters may not be perfect. Hence, in some of the numerical results (described later), the effect of such inaccuracies on the system performance is considered. Furthermore, the phase-shifter implementation may also suffer from some level of inaccuracy due to hardware limitations. Some parts of the numerical results consider this issue as well.

FIGS. 11 to 20 compare the throughput of the misaligned OAM-MM system after applying the codebook-based misalignment mitigation against two other methods, namely, the SVD-based method, and the beam steering (BS) approach (see Reference [R10]). The SVD method is implemented in the digital domain and only provides the theoretical upper bound. The BS method is an analog-only solution, which solves the misalignment problem by steering the beam axis of the OAM beam towards the misaligned antenna. On all figures, the codebook-based BF method disclosed herein is identified as "CB", the beam steering method as "BS", the conventional DFT-based method as "C-OAM", and the SVD method as "SVD". When quantization is used (that is, quantizing the phase-shifter values), the number of quantization bits are displayed on the figures' legend as "B=x", where x is the number of quantization bits. Cases without quantization are identified by not having "B=x" legend or by using the "NQ" tag.

Figure 11:
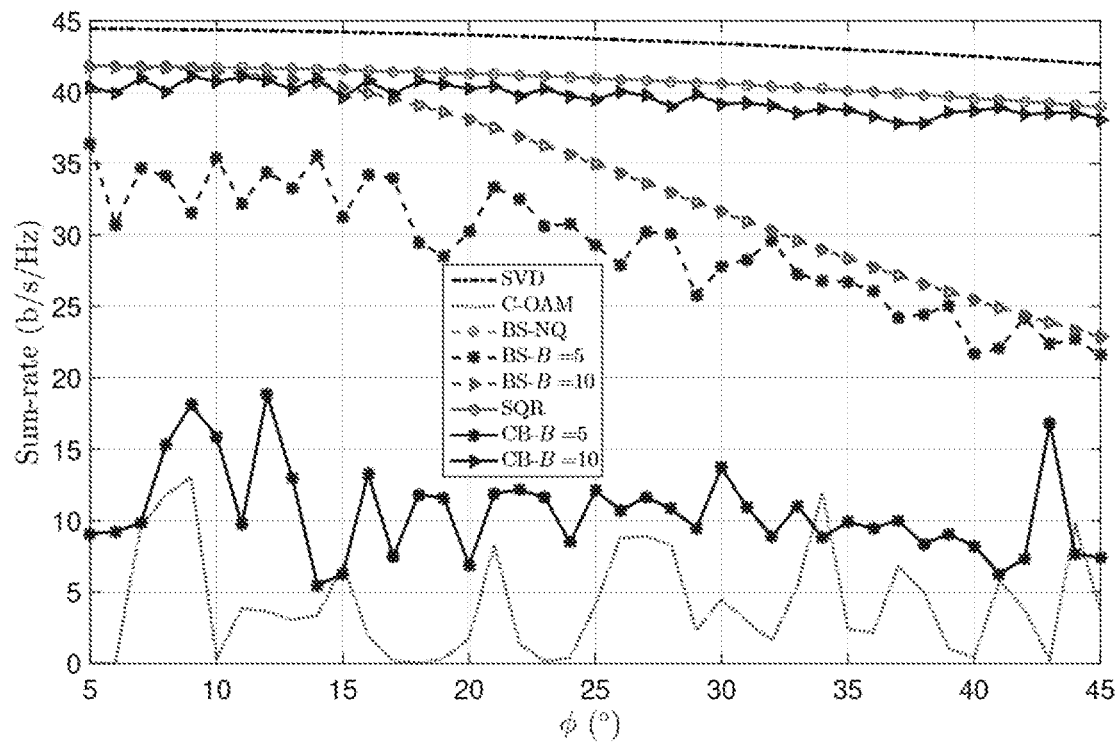
FIG. 11 is a plot showing the sum-rate of the OAM-MM system in the non-parallel misalignment scenario.

In FIG. 11, the sum-rate of the OAM-MM system is shown when the receiving UCA is rotated by up to 45°. Here, the distance D between the transmitting and receiving UCAs 344 and 354 is D=200 meters (m), and $\gamma_{in} \triangleq P/\sigma_n^2 = 30$ dB, where P is the total transmit power of the transmitted signal, that is $=E[x^H x]$. It is observed that the codebook-based BF with B=10 outperforms the BS method. This superiority is further noticed at the large $\phi$ values, for example, 20°, where the performance of the BS approach faces a steep drop.

Figure 12:
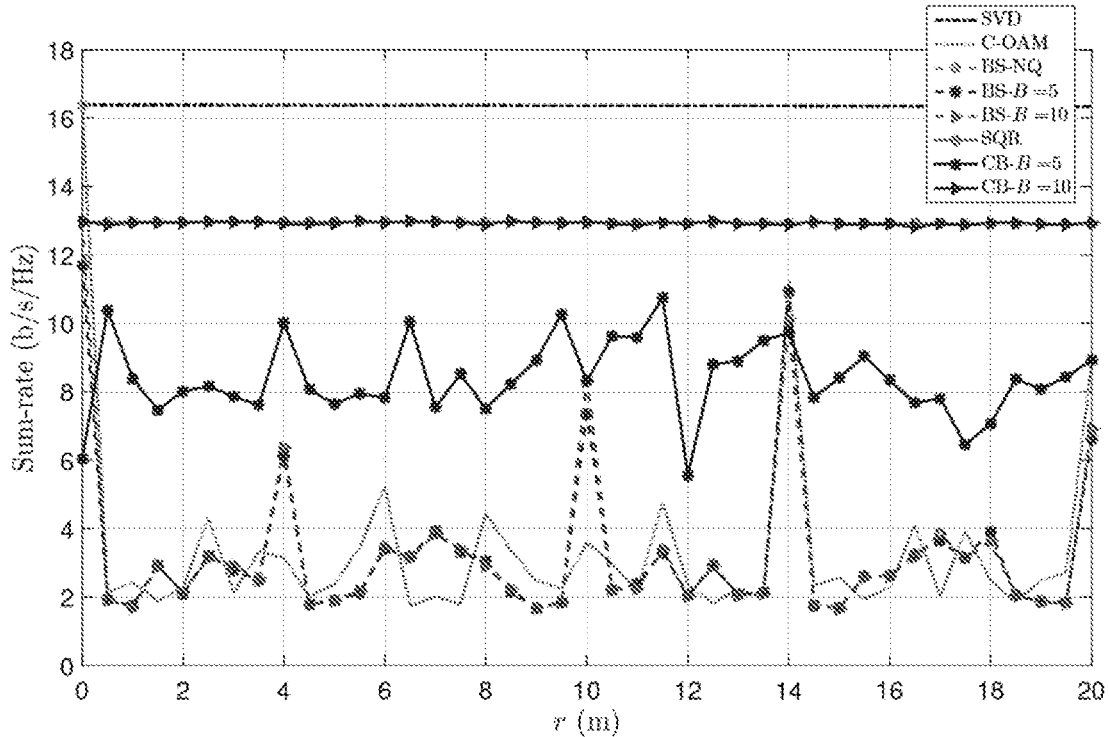
FIG. 12 is a plot showing the sum-rate of the OAM-MM system in the off-axis misalignment scenario.

In FIG. 12, the sum-rate of the system is displayed for the off-axis scenario. For simplicity, the center of receiving UCA is moved along the x-axis, that is, $\theta=0$ (see FIGS. 8A and 8B). However, similar results are obtained for any other $\theta$ value. The displacement along the x-axis is from r=0 to r=20 m. It is observed that the codebook-based BF method shows consistent results regardless of the misalignment severity. In contrast, the beam steering approach results in a small and inconsistent sum-rate.

Figure 13:
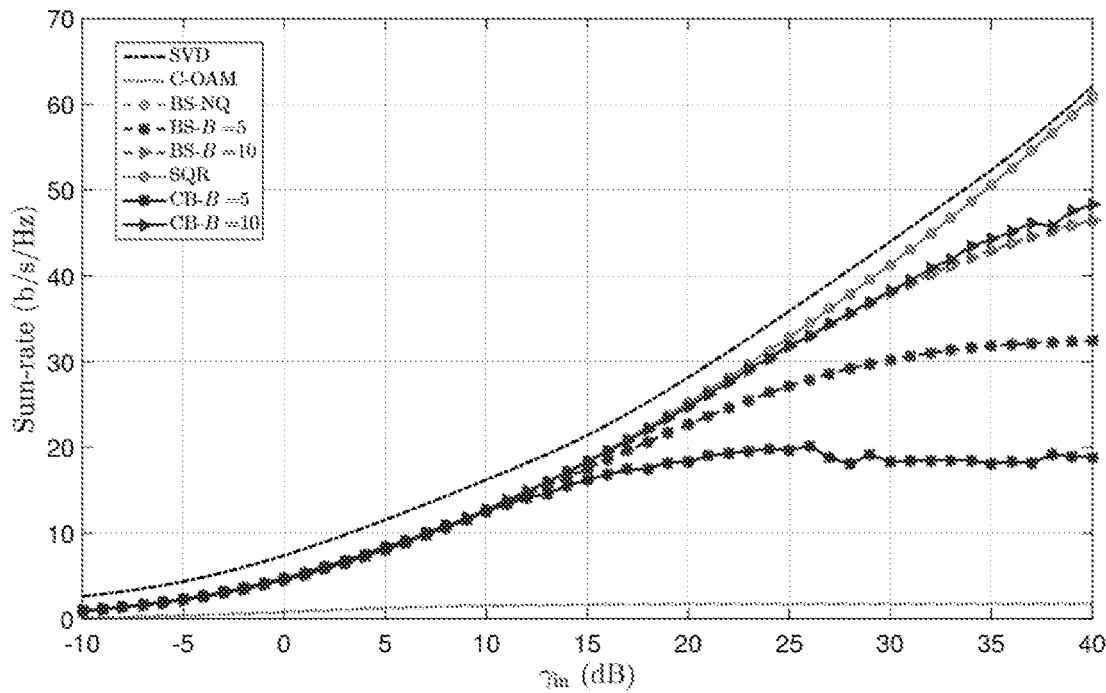
FIG. 13 is a plot showing the sum-rate of the OAM-MM system with respect to transmit signal-to-noise ratio (SNR) in the non-parallel misalignment scenario.
Figure 14:
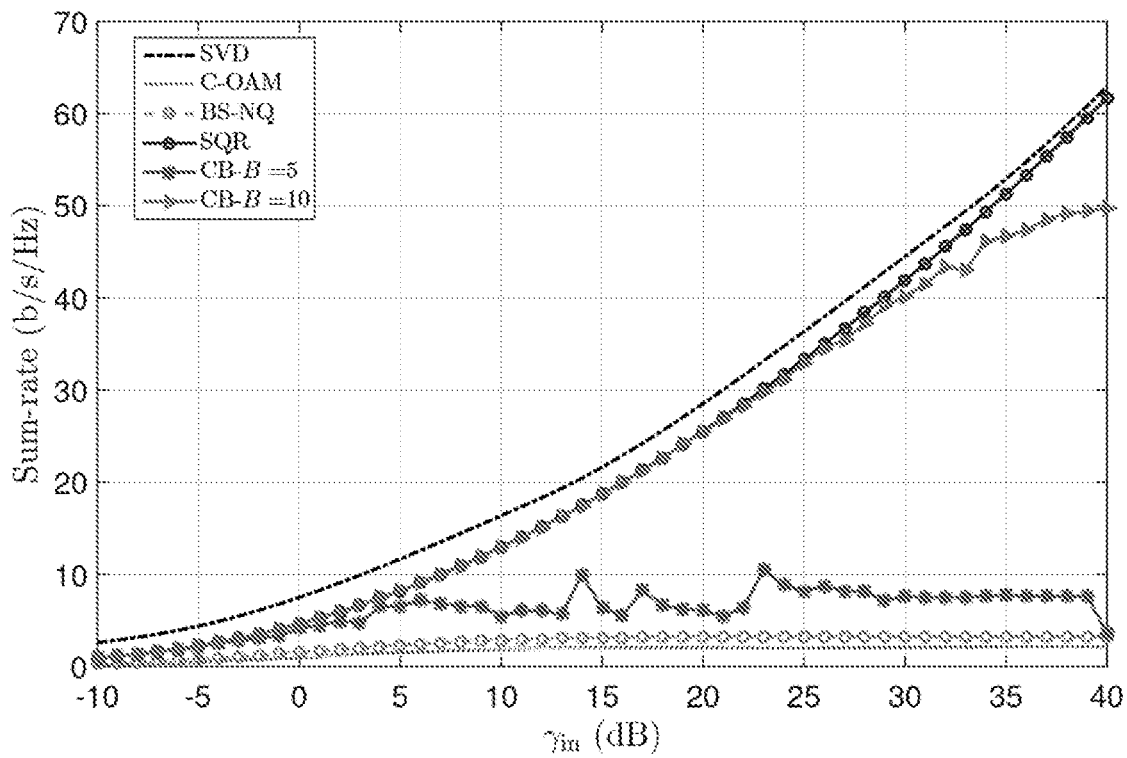
FIG. 14 is a plot showing the sum-rate of the OAM-MM system with respect to transmit SNR in the off-axis misalignment scenario.

In FIGS. 13 and 14, the system sum-rate is shown for different transmission SNRs at D=200 m. Here, the misalignment parameters for the off-axis and non-parallel cases are (r=1.5 m and $\theta=0$°), and $\phi=20$°, respectively. In FIG. 13, except for the curves corresponding to B=5, both the beam steering method and the codebook-based BF method perform close to the upper bound. The gap between the SVD method and the codebook-based BF method with B=10 at high transmission SNRs, for example, at $\gamma_{in} > 30$ dB, confirms that at those SNR values a higher number of quantization bits is desired.

In the off-axis case in FIG. 14, the codebook-based BF method outperforms the beam steering approach by a large margin. Except at high transmission SNRs, the sum-rate is identical to that of the SQR-based method and is very close to the SVD. The BS method, however, fails in compensating for the off-axis antenna misalignment at all transmission SNRs.

The effect of phase-shifter implementation error on the system throughput when the codebook-based BF is used is also simulated, wherein the phase-shifter error, denoted by x, is normally distributed, that is, $K \sim N(0, \sigma_K^2)$, and the standard deviation of error is proportional to phase-shifter resolution through the parameter $\alpha_K$, that is, $\sigma_K = 2\pi/2^B \alpha_K$. In the simulations, $\alpha_K\%$ is used to represent the level of phase-shifter implementation error.

Figure 15:
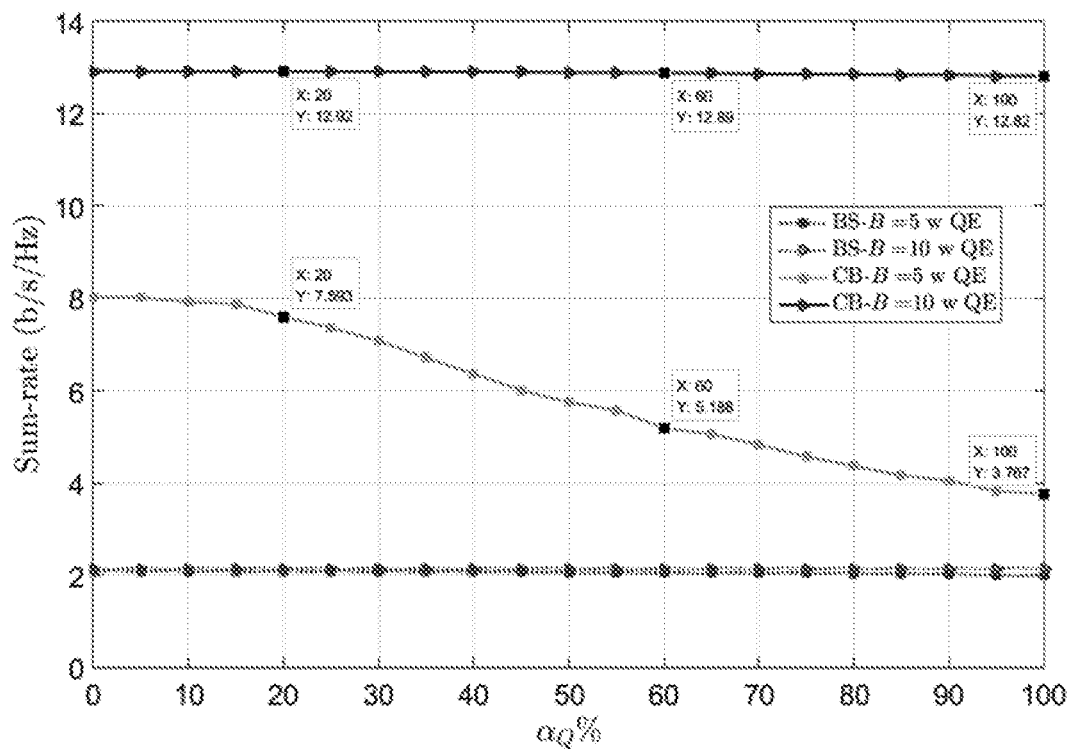
FIG. 15 is a plot showing the sum-rate of the OAM-MM system affected by off-axis misalignment with respect to phase-shifter implementation error parameter.
Figure 16:
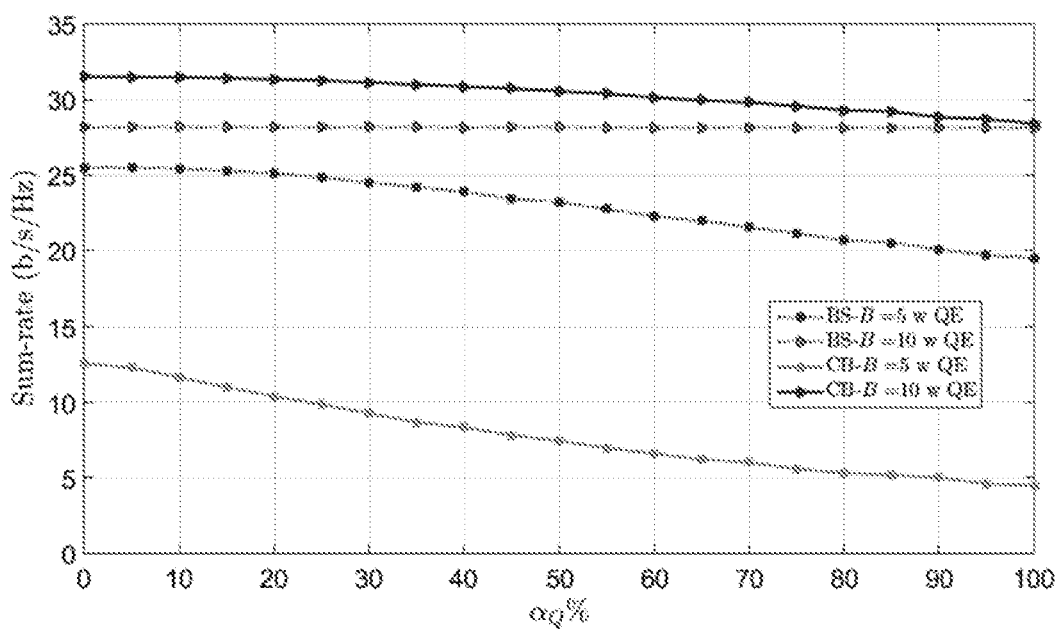
FIG. 16 is a plot showing the sum-rate of the OAM-MM system affected by non-parallel misalignment with respect to phase-shifter implementation error parameter.

In FIGS. 15 and 16, the system throughput is shown with respect to $\alpha_K\%$ for the off-axis and non-parallel misalignment scenarios, respectively. For a given $\alpha_K$, the throughput is calculated by generating 500 phase-shifter errors with $\alpha_K = 2\pi/2^B \alpha_K$ and taking the average of the corresponding 500 throughput values. FIG. 15 shows the system throughput for the off-axis scenario, where r=2 m and $\theta=0$°. It is observed that for the systems with high-resolution phase shifters, the effect of implementation error is negligible, while in the system with low-resolution phase shifters, the performance degradation is significant.

In the case of non-parallel misalignment in FIG. 16, where $\phi=30$°, the codebook-based BF method maintains its superiority over the BS method only up to an implementation error parameter of about 100%. Therefore, the BS method is more robust against this type of implementation error. Nonetheless, the codebook-based BF method performs better for error parameters smaller than 100%, which is what is expected from a normal phase-shifter implementation.

In the presence of misalignment-parameter estimation error (PE), the control unit may choose an incorrect BF vector. However, since the PE is usually small, the chosen BF vector may not be significantly different from the desired one. The following assesses the effect of such estimation error on the performance of the system.

The PE may be modeled as a Gaussian random variable. For instance, in the non-parallel scenario such error is denoted by $\phi_e \sim N(0, \sigma_{PE}^2)$, while the actual misalignment parameter is denoted by $\phi_M$. Hence, the input to the control unit may be $\phi_M + \phi_e$. To evaluate the effect of PE on the throughput, the sum-rate of the system is calculated with respect to $\sigma_{PE}$. The parameter $\sigma_{PE}$ is chosen based on the misalignment type.

Figure 17:
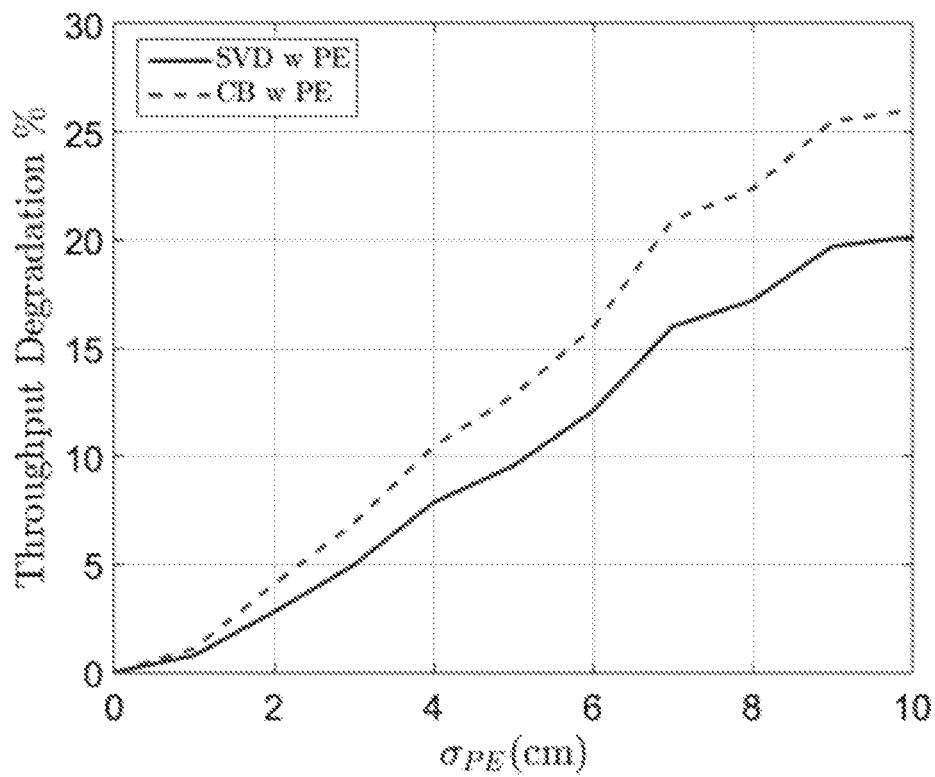
FIGS. 17 and 18 are plots showing the sum-rate of the OAM-MM system affected by off-axis misalignment with respect to different parameters.
Figure 18:
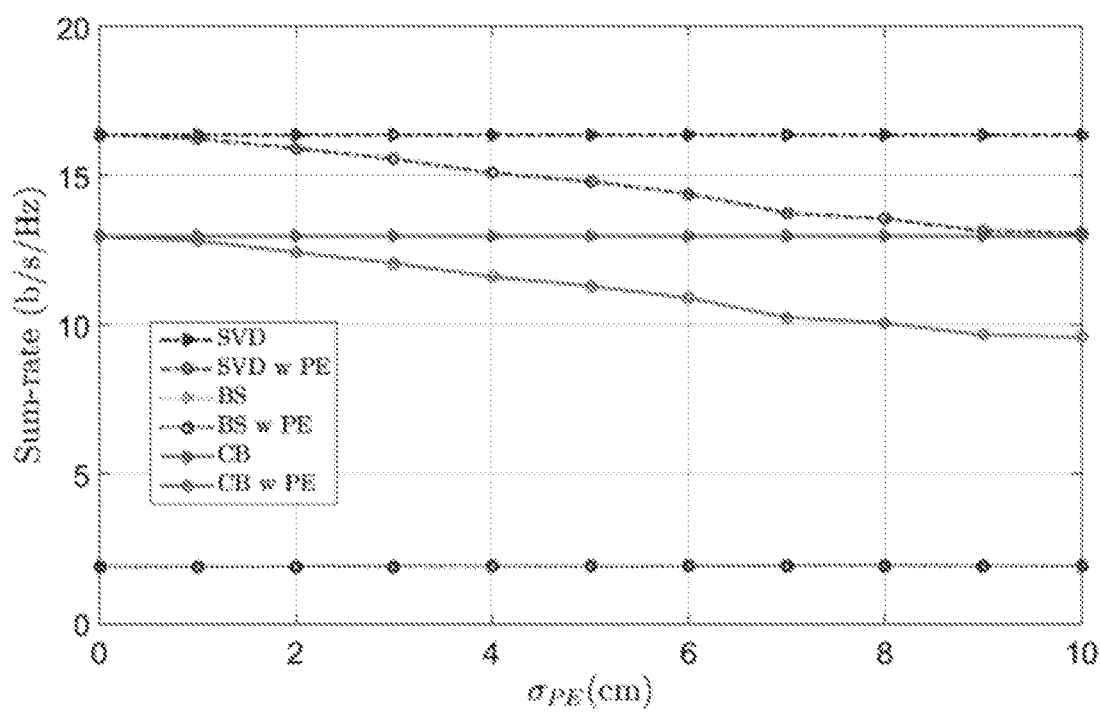

In FIGS. 17 and 18, the off-axis scenario affected by PE is considered, where r=0.5 m and $\theta=0$°. Here, the throughput of each method with and without PE are compared in FIG. 18, while the normalized throughput degradation is shown in FIG. 17. It is evident that the degradation of the codebook-based BF method is comparable to that of SVD, which confirms that while the codebook-based BF method is affected by the PE, this effect may not be significant. In fact, for small $\sigma_{PE}$ values, the degradation of both methods is very similar, and for larger $\sigma_{PE}$ values, the codebook-based BF method degrades slightly more than the SVD method.

Figure 19:
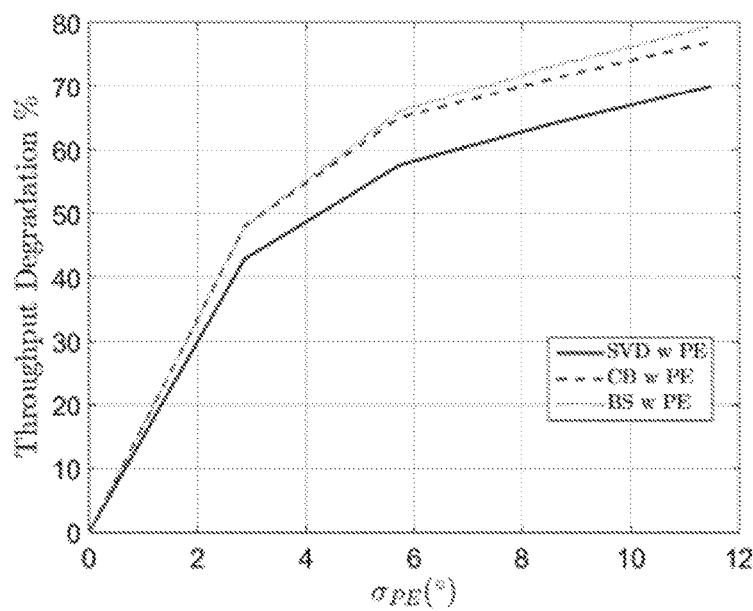
FIGS. 19 and 20 are plots showing the sum-rate of the OAM-MM system affected by non-parallel misalignment with respect to different parameters.
Figure 20:
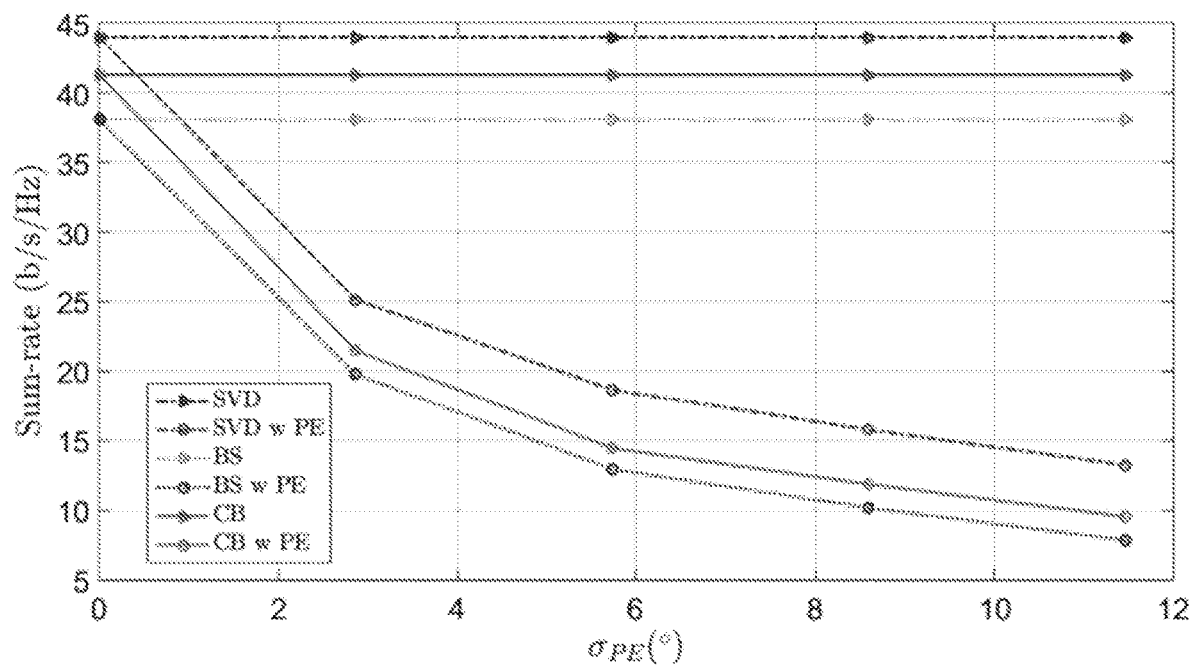

In FIGS. 19 and 20, a similar comparison to that of FIGS. 17 and 18 is performed in a non-parallel scenario, where $\phi=20$°. It is observed that the degradation due to PE is almost similar among all the three methods. For the small $\sigma_{PE}$ values, the normalized degradation curves overlap, and for the larger values, the degradations are not much different. This once again confirm that the codebook-based BF method does not suffer from any sensitivity with respect to PE.

The codebook-based BF method and the communication system 100 disclosed herein provide many advantages such as:

(i) Receiver-Side Solution

In the codebook-based BF method, some of the common DSP modules may not be required due to the use of a receiver-side solution. For example, since the channel is calculated by considering the geometry of the antennas, the channel estimation is not required. An important consequence of avoiding the channel estimation is to omit the pilot signals. This results in decreasing the computational complexity of the system and increasing its SE due to removal of the pilot signals. Moreover, no feedback channel is used for reporting channel state information.

Another advantage of using a receiver-side solution is to keep the conventional OAM BF unchanged. It is known that the OAM BF may be implemented efficiently, for example, by using a Butler matrix. A receiver-side solution takes advantage of such efficient implementation while dealing with the misalignment problem in the other end of the transmission.

(ii) Codebook-Based Solution

The main advantage of conventionally used DFT-based BF is that the receiver BF vectors are pre-determined. Hence, no real-time calculation is required. Since the DFT-based solution performs poorly in a misaligned system, an alternative BF is required. However, solutions relying on the real-time calculation of the coefficients cannot be implemented in the RF domain (that is, it would not be an analog-only solution), which would be a great sacrifice in terms of system complexity. The codebook-based BF method avoids making such sacrifice by taking advantage of pre-determined BF vectors in the codebook, wherein a control unit chooses the BF vector corresponding to the misalignment parameter(s) and type. When the misalignment parameters are updated, the BF matrix may be easily updated.

(iii) Near-Optimal Performance

As it can be seen from FIGS. 10 to 13, the codebook-based BF method performs very close to a theoretical upper-bound. Moreover, the performance is consistent over a wide range of misalignment parameter values, and it is equally good for both types of misalignment. This is a significant advantage of the codebook-based BF method compared to the limited number of existing state-of-the-art analog-only solutions in the literature.

(iv) Robustness Against Implementation Errors

As it can be seen from the above-described numerical results, the performance degradation due to non-idealities in the system disclosed herein is comparable to existing solutions. Hence, the performance of the system disclosed herein is not excessively sensitive to misalignment PE or to the phase-shifter implementation error.

In above embodiments, the possible misalignment parameters such as the possible non-parallel angles $\phi$, off-axis distances r, and off-axis angles $\theta$ are further discretized after their values are calculated. In some alternative embodiments, the possible misalignment parameters may not be further discretized and will take the calculated values.

In some alternative embodiments, instead of storing the BF matrices inside a codebook, the BF matrices may be calculated in real-time using an online process. In these embodiments, the misalignment parameter and/or misalignment type may be used in a processing unit, and the above-described BF method is applied to generate/determine the BF vector. In these embodiments, instead of discretizing the possible non-parallel angles $\phi$, off-axis distances r, and off-axis angles $\theta$ to $N_{OA}$, $N_{NPr}$, $N_{NPt}$ values between 0 and $\phi^*$, between 0 and $r^*$, and 0 and $\theta^*$, respectively, the actual misalignment parameters are measured and optionally discretized, which is then used for determining the BF vector.

In above embodiments, the obtained BF vectors are quantized using Equation (9). In some alternative embodiments, other suitable quantization methods may be used.

In above embodiments, the obtained BF vectors are quantized. In some alternative embodiments, the obtained BF vectors are not quantized.

In these embodiments, the generated/determined BF vector belongs to the pre-calculated BF matrices.

In these embodiments, the use of real-time calculation may alleviate the need for storing the pre-calculated BF matrices, thereby reducing the memory requirement.

In above-described embodiments, the system disclosed herein solves the problem of mode decomposition in the OAM-MM systems affected by the antenna misalignment in a manner similar to solving the problem of MU-MIMO detection. In some embodiments, the system disclosed herein uses an analog method (in the analog domain and/or the RF band for shifting phases of the copies of the OAM beam received by the receiving antennas using the selected BF vector, before the copies of the received OAM beam are quantized or discretized) for efficiently solving the misalignment problem in the OAM-MM system. In some other embodiments, the selected BF vector may be used for shifting phases of the copies of the OAM beam after the copies of the received OAM beam are quantized or discretized.

In codebook construction, the system disclosed herein uses the discretization of the space around the antenna and the discretization of the misalignment parameter(s). In particular, by building a codebook, the costly computations of generating the BF vectors may be transformed to a simple BF selection process that is performed at a negligible cost. Such transformation guarantees that even a misaligned OAM-MM system may benefit from the low-computational complexity.

In some embodiments, the constructed BF codebook may be stored in one or more non-transitory computer-readable storage devices or media to allow the processing unit of the receiver to read and use.

In some embodiments, the above-described BF-codebook generation process 400 may be implemented as computer-executable code stored in one or more non-transitory computer-readable storage devices or media to allow the processing unit of the receiver to read and execute.

In above embodiments, a UCA is used to generate the OAM carrying beams. Those skilled in the art will appreciate that the UCA is not the only AA that can generate the OAM carrying beams, and other AAs may be alternatively used for the same purpose, for example, a planar array. Regardless of what type of AA is used, the above-described method may be applied to generate the BF codebook. The only difference lies in the geometry of antennas that are used in the codebook construction process. Clearly, with an alternative AA, a different BF matrix is also required to generate the OAM beams, which, however, does not make any significant difference in the principle of above-described method, because the method described above is applied on the receiver-side and does not modify the transmit-side operation.

In some embodiments, the above-described method may be used in the so-called OAM-MIMO systems. An example of the OAM-MIMO architecture is the concentric UCAs at each side of the transmission, where each UCA, as a whole, acts as a single antenna in a MIMO framework. In the case of OAM-MIMO system affected by antenna misalignment, the above-described method may be used with the following modifications: a) The system model may be formulated to consider the multi-UCA state, b) The effect of interference from one UCA to another may be considered in the baseband block, and 3) The number of codebooks should match that of receiving UCAs. Therefore, one codebook per receive-side UCA is required.

D. Acronym Key

AA: Antenna Array
BBU: Baseband Unit
BF: Beamforming
DFT: Discrete Fourier Transform
EM: Electromagnetic
i.i.d.: Independent and Identically Distributed
IMI: Inter-mode Interference
LoS: Line-of-sight MMSE: Minimum Mean Squared Error
MIMO: Multiple-input Multiple-output
MU-MIMO: Multi-user Multiple-input Multiple-output
OAM: Orbital Angular Momentum
PE: Parameter Estimation Error
PS: Phase Shifter
RF: Radio Frequency
SNR: Signal-to-Noise Ratio
SVD: Singular Value Decomposition
SQR: Sorted-QR
SIC: Successive Interference Cancellation
UCA: Uniform Circular Array E. References

[R1] Japanese Patent Publication No. JP2019062297A and Japanese Patent No. JP6811155B2 entitled "OAM MULTIPLEX COMMUNICATION SYSTEM AND ANTENNA AXIS MISALIGNMENT CORRECTION METHOD" to HIROYUKI, et al.
[R2] Japanese Patent Publication No. JP2018037744A and Japanese Patent No. JP6663328B2 entitled "ANTENNA ADJUSTMENT METHOD AND COMMUNICATION SYSTEM" to HIDEYUKI, et al.
[R3] Y. Zhou, H. Tian and G. Nie, "Novel method of axis alignment in orbital angular momentum wireless communication," in IEEE Wireless Communications and Networking Conference (WCNC), 2015.
[R4] PCT Patent Publication No. WO/2021/107348 entitled "METHOD FOR COMPENSATING ANTENNA MISALIGNMENT IN OAM COMMUNICATION SYSTEM, AND DEVICE FOR PERFORMING SAME" to TAE, et al.
[R5] PCT Patent Publication No. WO/2019/059406 A1, Chinese Patent Publication No. CN111133697A, US Patent Publication No. US 2020/228195 A1, European Patent Office (EPO) Patent Publication No. EP3691150A1, and Japanese Patent Publication No. JPW02019059406A1 entitled "OAM MULTIPLEXING COMMUNICATION SYSTEM AND INTER-MODE INTERFERENCE ELIMINATION METHOD" to HIROFUMI, et al.
[R6] Korean Patent No. KR101669354B1 and Korean Patent Publication No. KR20160091762A entitled "Apparatus and method for compensation the position of the antenna in communication with the orbital angular momentum".
[R7] X. Wu, J. Liu, and S. Yu, "Inter-mode crosstalk compensation for radio orbital angular momentum multiplexing systems under misaligned condition using multiple-input multiple-output techniques," in International Conference on Optical Communications and Networks, 2016.
[R8] R. Chen, H. Xu, J. Li, and Y. Zhang, "Misalignment-robust receiving scheme for UCA-based OAM communication systems," in IEEE Vehicular Technology, 2017.
[R9] Chinese Patent Publication No. CN110266354A and Chinese Patent No. CN110266354B entitled "Signal receiving method of orbital angular momentum wireless communication system" to CHEN, et al.
[R10] R. Chen, H. Xu, M. Moretti and J. Li, "Beam Steering for the Misalignment in UCA-Based OAM Communication Systems," IEEE Wireless Communications Letters, 2018.
[R11] D. Wubben, R. Bohnke, V. Kuhn, and K.-D. Kammeyer, "MMSE extension of V-BLAST based on sorted QR decomposition," in IEEE Vehic. Technol. Conf, 2003.
[R12] S. Payami, M. Ghoraishi, and M. Dianati, "Hybrid beamforming for large antenna arrays with phase shifter selection," IEEE Transactions on Wireless Communication, vol. 15, no. 11, pp. 7258-7271, 2016.

Although embodiments have been described above with reference to the accompanying drawings, those of skill in the art will appreciate that variations and modifications may be made without departing from the scope thereof as defined by the appended claims.

What is claimed is:

1. A method comprising:
    determining a set of phase-shifting values based on a parameter-value set of a set of antenna-misalignment parameters between a transmitting antenna array and a receiving antenna array, the set of antenna-misalignment parameters comprising one or more antenna-misalignment parameters and the parameter-value set comprising one or more values of the one or more antenna-misalignment parameters, the receiving antenna array comprising a plurality of receiving antennas each receiving a copy of an orbital angular momentum (OAM) beam from the transmitting antenna array;
    shifting phases of the received copies of the OAM beam using the set of determined phase-shifting values to obtain a plurality of phase-shifted copies of the OAM beam; and
    detecting the signal by combining the plurality of phase-shifted copies of the OAM beam.

2. The method of claim 1, wherein said shifting the phases of the received copies of the OAM beam using the set of determined phase-shifting values comprises:
    shifting the phases of the received copies of the OAM beam using the set of determined phase-shifting values in an analog domain and/or in a radio-frequency (RF) band.

3. The method of claim 1, wherein said detecting the signal by combining the plurality of phase-shifted copies of the OAM beam comprises:
    converting the plurality of phase-shifted copies of the OAM beam to a baseband; and
    extracting the signal from the converted copies of the OAM beam using a successive interference cancellation (SIC) method.

4. The method of claim 1, wherein the set of antenna-misalignment parameters comprises: a non-parallel angle $\phi$ between the transmitting antenna array and the receiving antenna array, or a combination of an off-axis distance r and an off-axis angle $\theta$ between the transmitting antenna array and the receiving antenna array.

5. The method of claim 1, wherein said determining the set of phase-shifting values comprises:
    determining a misaligned channel $\overline{H}$ based on the parameter-value set;
    determining an augmented channel matrix $\hat{H}$ being an aggregation of a combined channel matrix H and a covariance matrix of an additive noise, the combined channel matrix H combining the misaligned channel $\overline{H}$ and a transmitting BF matrix;
    calculating a set of unit-magnitude values based on the augmented channel matrix $\hat{H}$; and
    determining the set of phase-shifting values as phases of the set of unit-magnitude values.

6. The method of claim 5, wherein said determining the set of phase-shifting values as phases of the set of unit-magnitude values comprises:
    quantizing the phases of the set of unit-magnitude values to a predefined number of bits; and determining the set of phase-shifting values as the quantized phases.

7. The method of claim 5, wherein said determining the set of unit-magnitude elements based on the augmented channel matrix $\hat{H}$ comprises:
  decomposing the augmented channel matrix $\hat{H}$ using a sorted QR (SQR) decomposition method to obtain an orthogonal matrix $\hat{Q}=[Q_1^T, Q_2^T]^T$ with $Q_1$ being the upper portion of $\hat{Q}$ having a same number of rows as the combined channel matrix H;
  partitioning the orthogonal matrix $\hat{Q}$ to the summation of two matrices $\hat{Q}_A$ and $\hat{Q}_B$ having unit-magnitude elements;
  retrieving a portion $Q_{A1}$ of $\hat{Q}_A$ having a same size as $Q_1$;
  retrieving a portion $Q_{B1}$ of $\hat{Q}_B$ having a same size as $Q_1$; and
  using elements of $Q_{A1}$ and $Q_{B1}$ as the set of unit-magnitude values.

8. The method of claim 1, wherein said determining the set of phase-shifting values comprises:
  selecting the set of phase-shifting values from a beamforming (BF) codebook based on the parameter-value set.

9. The method of claim 8, wherein the BF codebook is constructed by:
  determining one or more ranges for the one or more antenna-misalignment parameters;
  obtaining a plurality of possible parameter-value sets within the one or more ranges;
  for each possible parameter-value set of the plurality of parameter-value sets,
    determining a misaligned channel $\overline{H}$ based on the possible parameter-value set,
    determining an augmented channel matrix $\hat{H}$ being an aggregation of a combined channel matrix H and an independent and a covariance matrix of an additive noise, the combined channel matrix H combining the misaligned channel $\overline{H}$ and a transmitting BF matrix,
    determining a set of unit-magnitude values based on the augmented channel matrix $\hat{H}$,
    determining a set of possible phase-shifting values as phases of the set of unit-magnitude values, and
    adding the set of possible phase-shifting values to the BF codebook.

10. The method of claim 9, wherein said determining the set of possible phase-shifting values further comprises:
  quantizing the phases of the set of unit-magnitude values to a predefined number of bits; and
  determining the set of possible phase-shifting values as the quantized phases.

11. The method of claim 9, wherein said determining the set of unit-magnitude elements based on the augmented channel matrix $\hat{H}$ comprises:
  decomposing the augmented channel matrix $\hat{H}$ using a sorted QR (SQR) decomposition method to obtain an orthogonal matrix $\hat{Q}=[Q_1^T, Q_2^T]^T$ with $Q_1$ being the upper portion of $\hat{Q}$ having a same number of rows as the combined channel matrix H;
  partitioning the orthogonal matrix $\hat{Q}$ to the summation of two matrices $\hat{Q}_A$ and $\hat{Q}_B$ having unit-magnitude elements;
  retrieving a portion $Q_{A1}$ of $\hat{Q}_A$ having a same size as $Q_1$;
  retrieving a portion $Q_{B1}$ of $\hat{Q}_B$ having a same size as $Q_1$; and
  using elements of $Q_{A1}$ and $Q_{B1}$ as the set of unit-magnitude values.

12. An apparatus comprising:
  at least one processor for:
    determining a set of phase-shifting values based on a parameter-value set of a set of antenna-misalignment parameters between a transmitting antenna array and a receiving antenna array, the set of antenna-misalignment parameters comprising one or more antenna-misalignment parameters and the parameter-value set comprising one or more values of the one or more antenna-misalignment parameters, the receiving antenna array comprising a plurality of receiving antennas each receiving a copy of an orbital angular momentum (OAM) beam from the transmitting antenna array;
    shifting phases of the received copies of the OAM beam using the set of determined phase-shifting values to obtain a plurality of phase-shifted copies of the OAM beam; and
    detecting the signal by combining the plurality of phase-shifted copies of the OAM beam.

13. The apparatus of claim 12, wherein the set of antenna-misalignment parameters comprises: a non-parallel angle φ between the transmitting antenna array and the receiving antenna array, or a combination of an off-axis distance r and an off-axis angle θ between the transmitting antenna array and the receiving antenna array.

14. The apparatus of claim 12, wherein said determining the set of phase-shifting values comprises:
  selecting the set of phase-shifting values from a beamforming (BF) codebook based on the parameter-value set.

15. The apparatus of claim 14, wherein the BF codebook is constructed by:
  determining one or more ranges for the one or more antenna-misalignment parameters;
  obtaining a plurality of possible parameter-value sets within the one or more ranges;
  for each possible parameter-value set of the plurality of parameter-value sets,
    determining a misaligned channel $\overline{H}$ based on the possible parameter-value set,
    determining an augmented channel matrix $\hat{H}$ being an aggregation of a combined channel matrix H and a covariance matrix of an additive noise, the combined channel matrix H combining the misaligned channel $\overline{H}$ and a transmitting BF matrix,
    determining a set of unit-magnitude values based on the augmented channel matrix $\hat{H}$,
    determining a set of possible phase-shifting values as phases of the set of unit-magnitude values, and
    adding the set of possible phase-shifting values to the BF codebook.

16. The apparatus of claim 15, wherein said determining the set of possible phase-shifting values further comprises:
  quantizing the phases of the set of unit-magnitude values to a predefined number of bits; and
  determining the set of possible phase-shifting values as the quantized phases.

17. The apparatus of claim 15, wherein said determining the set of unit-magnitude elements based on the augmented channel matrix $\hat{H}$ comprises:
  decomposing the augmented channel matrix $\hat{H}$ using a sorted QR (SQR) decomposition method to obtain an orthogonal matrix $\hat{Q}=[Q_1^T, Q_2^T]^T$ with $Q_1$ being the upper portion of $\hat{Q}$ having a same number of rows as the combined channel matrix H;

partitioning the orthogonal matrix $\hat{Q}$ to the summation of two matrices $\hat{Q}_A$ and $\hat{Q}_B$ having unit-magnitude elements;

retrieving a portion $Q_{A1}$ of $\hat{Q}_A$ having a same size as $Q_1$;

retrieving a portion $Q_{B1}$ of $\hat{Q}_B$ having a same size as $Q_1$; and using elements of $Q_{A1}$ and $Q_{B1}$ as the set of unit-magnitude values.

18. One or more non-transitory computer-readable storage devices comprising computer-executable instructions for constructing a BF codebook, wherein the instructions, when executed, cause a processing structure to perform actions comprising:

determining one or more ranges for the one or more antenna-misalignment parameters;

obtaining a plurality of possible parameter-value sets within the one or more ranges;

for each possible parameter-value set of the plurality of parameter-value sets, determining a misaligned channel $\overline{H}$ based on the possible parameter-value set, determining an augmented channel matrix $\hat{H}$ being an aggregation of a combined channel matrix H and a covariance matrix of an additive noise, the combined channel matrix H combining the misaligned channel $\overline{H}$ and a transmitting BF matrix, determining a set of unit-magnitude values based on the augmented channel matrix $\hat{H}$, determining a set of possible phase-shifting values as phases of the set of unit-magnitude values, and adding the set of possible phase-shifting values to the BF codebook.

19. The one or more non-transitory computer-readable storage devices of claim 18, wherein said determining the set of possible phase-shifting values further comprises:

quantizing the phases of the set of unit-magnitude values to a predefined number of bits; and determining the set of possible phase-shifting values as the quantized phases.

20. The one or more non-transitory computer-readable storage devices of claim 18, wherein said determining the set of unit-magnitude elements based on the augmented channel matrix $\hat{H}$ comprises:

decomposing the augmented channel matrix $\hat{H}$ using a sorted QR (SQR) decomposition method to obtain an orthogonal matrix $\hat{Q}=[Q_1^T, Q_2^T]^T$ with $Q_1$ being the upper portion of $\hat{Q}$ having a same number of rows as the combined channel matrix H;

partitioning the orthogonal matrix $\hat{Q}$ to the summation of two matrices $\hat{Q}_A$ and $\hat{Q}_B$ having unit-magnitude elements;

retrieving a portion $Q_{A1}$ of $\hat{Q}_A$ having a same size as $Q_1$;

retrieving a portion $Q_{B1}$ of $\hat{Q}_B$ having a same size as $Q_1$; and using elements of $Q_{A1}$ and $Q_{B1}$ as the set of unit-magnitude values.

* * * * *